US012695895B2

(12) United States Patent
Li et al.

(10) Patent No.: US 12,695,895 B2
(45) Date of Patent: *Jul. 28, 2026

(54) RULES FOR INTRA-PICTURE PREDICTION MODES WHEN WAVEFRONT PARALLEL PROCESSING IS ENABLED

(71) Applicant: Microsoft Technology Licensing, LLC, Redmond, WA (US)

(72) Inventors: Bin Li, Beijing (CN); Jizheng Xu, Beijing (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 92 days.

This patent is subject to a terminal disclaimer.

(21) Appl. No.: 18/783,241

(22) Filed: Jul. 24, 2024

(65) Prior Publication Data

US 2024/0380908 A1 Nov. 14, 2024

Related U.S. Application Data

(63) Continuation of application No. 18/218,796, filed on Jul. 6, 2023, now Pat. No. 12,081,779, which is a
(Continued)

(51) Int. Cl.
*H04N 19/436* (2014.01)
*H04N 19/11* (2014.01)
(Continued)

(52) U.S. Cl.
CPC ........... *H04N 19/436* (2014.11); *H04N 19/11* (2014.11); *H04N 19/129* (2014.11);
(Continued)

(58) Field of Classification Search
CPC .... H04N 19/11; H04N 19/129; H04N 19/174; H04N 19/176; H04N 19/186;
(Continued)

(56) References Cited

U.S. PATENT DOCUMENTS 6,249,549 B1 6/2001 Kim
7,027,654 B1 4/2006 Ameres et al.
(Continued)

FOREIGN PATENT DOCUMENTS

EP 3090553 11/2016

OTHER PUBLICATIONS

Communication pursuant to Article 94(3) EPC dated Aug. 27, 2024, from European Patent Application No. 22182574.8, 7 pp.
(Continued)

*Primary Examiner* — Kathleen M Walsh
(74) *Attorney, Agent, or Firm* — Klarquist Sparkman, LLP

(57) ABSTRACT

Various innovations facilitate the use of intra-picture prediction modes such as palette prediction mode, intra block copy mode, intra line copy mode and intra string copy mode by an encoder or decoder when wavefront parallel processing ("WPP") is enabled. For example, for a palette coding/decoding mode, an encoder or decoder predicts a palette for an initial unit in a current WPP row of a picture using previous palette data from a previous unit in a previous WPP row of the picture. Or, as another example, for an intra copy mode (e.g., intra block copy mode, intra string copy mode, intra line copy mode), an encoder enforces one or more constraints attributable to the WPP, or a decoder receives and decodes encoded data that satisfies one or more constraints attributable to WPP.

20 Claims, 13 Drawing Sheets

1000

CTU columns
0 1 2 3 4 5 6 7

CTU rows
0
1
2
3
4
5 current picture
1010 processed with WPP enabled initial CTU in wave 4 direction of palette prediction when WPP is enabled:
• for initial CU in first CTU row – none
• for initial CU in later CTU rows – above-right, following arrows
• otherwise – left, following arrows

Related U.S. Application Data continuation of application No. 17/739,299, filed on May 9, 2022, now Pat. No. 11,758,162, which is a continuation of application No. 17/009,495, filed on Sep. 1, 2020, now Pat. No. 11,363,283, which is a continuation of application No. 15/515,559, filed as application No. PCT/CN2014/087885 on Sep. 30, 2014, now Pat. No. 10,812,817.

(51) Int. Cl.

| | |
|---|---|
| *H04N 19/129* | (2014.01) |
| *H04N 19/174* | (2014.01) |
| *H04N 19/176* | (2014.01) |
| *H04N 19/186* | (2014.01) |
| *H04N 19/463* | (2014.01) |
| *H04N 19/55* | (2014.01) |
| *H04N 19/593* | (2014.01) |
| *H04N 19/70* | (2014.01) |
| *H04N 19/96* | (2014.01) |

(52) U.S. Cl.
CPC ......... *H04N 19/174* (2014.11); *H04N 19/176* (2014.11); *H04N 19/186* (2014.11); *H04N 19/463* (2014.11); *H04N 19/55* (2014.11); *H04N 19/593* (2014.11); *H04N 19/70* (2014.11); *H04N 19/96* (2014.11)

(58) Field of Classification Search
CPC .... H04N 19/436; H04N 19/463; H04N 19/55; H04N 19/593; H04N 19/70; H04N 19/96
USPC ...................................................... 375/240.12
See application file for complete search history.

(56) References Cited

U.S. PATENT DOCUMENTS

| | | | |
|---|---|---|---|
| 9,591,325 | B2 | 3/2017 | Li et al. |
| 9,699,468 | B2 | 7/2017 | Guo et al. |
| 9,883,203 | B2 | 1/2018 | Chien et al. |
| 10,368,091 | B2 | 7/2019 | Li et al. |
| 10,390,034 | B2 | 8/2019 | Zhu et al. |
| 10,469,863 | B2 | 11/2019 | Zhu et al. |
| 10,506,254 | B2 | 12/2019 | Li et al. |
| 10,542,274 | B2 | 1/2020 | Li et al. |
| 10,582,213 | B2 | 3/2020 | Li et al. |
| 10,652,576 | B2 | 5/2020 | Li et al. |
| 10,659,783 | B2 | 5/2020 | Li et al. |
| 10,785,486 | B2 | 9/2020 | Li et al. |
| 10,812,817 | B2 | 10/2020 | Li et al. |
| 11,109,036 | B2 | 8/2021 | Li et al. |
| 11,172,207 | B2 | 11/2021 | Li et al. |
| 11,252,437 | B2 | 2/2022 | Li et al. |
| 11,284,103 | B2 | 3/2022 | Zhu et al. |
| 11,317,113 | B2 | 4/2022 | Li et al. |
| 11,363,283 | B2 * | 6/2022 | Li ........................... H04N 19/11 |
| 11,388,433 | B2 | 7/2022 | Zhu et al. |
| 11,539,956 | B2 | 12/2022 | Li et al. |
| 11,595,679 | B1 | 2/2023 | Zhu et al. |
| 11,632,558 | B2 | 4/2023 | Li et al. |
| 11,758,162 | B2 * | 9/2023 | Li ........................ H04N 19/174 375/240.12 |
| 11,910,005 | B2 | 2/2024 | Zhu et al. |
| 11,985,332 | B2 | 5/2024 | Li et al. |
| 12,081,779 | B2 * | 9/2024 | Li ........................ H04N 19/463 |
| 12,096,024 | B2 | 9/2024 | Li et al. |
| 12,244,823 | B2 | 3/2025 | Li et al. |
| 2005/0185937 | A1 | 8/2005 | Comer et al. |
| 2007/0206867 | A1 | 9/2007 | Tamura et al. |
| 2009/0262835 | A1 | 10/2009 | Srinivasan et al. |
| 2011/0194619 | A1 | 8/2011 | Yu et al. |
| 2013/0322531 | A1 | 12/2013 | Chen et al. |
| 2014/0003531 | A1 * | 1/2014 | Coban ................. H04N 19/174 375/240.24 |
| 2014/0085418 | A1 | 3/2014 | Takahashi et al. |
| 2014/0376634 | A1 | 12/2014 | Guo et al. |
| 2015/0195559 | A1 | 7/2015 | Chen et al. |
| 2015/0271487 | A1 | 9/2015 | Li et al. |
| 2015/0271515 | A1 | 9/2015 | Pang et al. |
| 2016/0100163 | A1 | 4/2016 | Rapaka et al. |
| 2016/0323591 | A1 * | 11/2016 | Chuang ................. H04N 19/13 |
| 2017/0026641 | A1 * | 1/2017 | Lai ........................ H04N 1/644 |
| 2017/0127058 | A1 * | 5/2017 | Misra .................. H04N 19/105 |
| 2017/0302966 | A1 | 10/2017 | Xu et al. |
| 2018/0184093 | A1 | 6/2018 | Xu et al. |
| 2020/0351521 | A1 | 11/2020 | Xu et al. |
| 2021/0360262 | A1 | 11/2021 | Li et al. |
| 2022/0201326 | A1 | 6/2022 | Li et al. |
| 2023/0091602 | A1 | 3/2023 | Li et al. |
| 2024/0146955 | A1 | 5/2024 | Zhu et al. |
| 2024/0244252 | A1 | 7/2024 | Zhu et al. |
| 2024/0275987 | A1 | 8/2024 | Li et al. |

OTHER PUBLICATIONS

Communication under Rule 71(3) EPC dated Sep. 4, 2018, from European Patent Application No. 13895617.2, 7 pp.
Decision to Grant dated Mar. 19, 2020, from European Patent Application No. 15894584.0, 2 pp.
Decision to Grant dated May 8, 2020, from European Patent Application No. 13895646.1, 2 pp.
Decision to Grant dated Jun. 24, 2021, from European Patent Application No. 14903497.7, 2 pp.
Decision to Grant dated Feb. 1, 2024, from European Patent Application No. 15704401.7, 3 pp.
Examiner's Report dated May 16, 2024, from Canadian Patent Application No. 3,171,803, 4 pp.
Final Office Action dated Jul. 30, 2024, from U.S. Appl. No. 17/390,570, 9 pp.
Intimation of Grant dated May 13, 2022, from Indian Patent Application No. 201647021659, 1 p.
Intimation of Grant dated May 17, 2023, from Indian Patent Application No. 201647010364, 1 p.
Intimation of Grant dated Aug. 2, 2023, from Indian Patent Application No. 201647009425, 1 p.
Intimation of Grant dated Aug. 24, 2023, from Indian Patent Application No. 201717043138, 1 p.
Intimation of Grant dated Nov. 13, 2023, from Indian Patent Application No. 201647024024, 1 p.
Intimation of Grant dated Dec. 31, 2023, from Indian Patent Application No. 201647042695, 1 p.
Intimation of Grant dated Jan. 30, 2024, from Indian Patent Application No. 201647022794, 1 p.
Intimation of Grant dated Feb. 22, 2024, from Indian Patent Application No. 201647028726, 1 p.
Notice of Acceptance dated Jun. 5, 2018, from Australian Patent Application No. 2013403225, 3 pp.
Notice of Allowance dated Jul. 16, 2018, from Mexican Patent Application No. MX/a/2016/009128, 2 pp.
Notice of Allowance dated Mar. 13, 2019, from U.S. Appl. No. 15/029,469, 5 pp.
Notice of Allowance dated Mar. 20, 2019, from U.S. Appl. No. 14/222,580, 8 pp.
Notice of Allowance dated May 26, 2020, from U.S. Appl. No. 15/515,559, 8 pp.
Notice of Allowance dated Jul. 31, 2019, from U.S. Appl. No. 15/025,134, 14 pp.
Notice of Allowance dated Jan. 28, 2020, from Mexican Patent Application No. MX/a/2016/004705, 3 pp.
Notice of Allowance dated Nov. 3, 2020, from Mexican Patent Application No. MX/a/2017/004211, 5 pp.
Notice on Grant of Patent dated Oct. 10, 2019, from Chinese Patent Application No. 201480071878.2, 4 pp.
Office Action dated Sep. 10, 2024, from U.S. Appl. No. 18/632,052, 8 pp.
U.S. Appl. No. 18/792,374, filed Aug. 1, 2024.
Bahari et al., "Low-Power H.264 Video Compression Architectures for Mobile Communication," IEEE Trans. On Circuits and Systems

(56) References Cited

OTHER PUBLICATIONS for Video Technology, vol. 19, No. 9, pp. 1251-1261 (Sep. 2009).
Budagavi et al., "HEVC ALF Decode Complexity Analysis and Reduction," IEEE Int'l Conf on Image Processing, pp. 733-736 (2011).
Communication pursuant to Article 94(3) EPC dated Aug. 11, 2025, from European Patent Application No. 21186125.7, 4 pp.
Communication pursuant to Rules 70(2) and 70a(2) dated Aug. 1, 2017, from European Patent Application No. 13895569.5, 2 pp.
Communication pursuant to Rules 70(2) and 70a(2) dated Dec. 12, 2017, from European patent application No. 17175228.0, 2 pp.
Communication under Rule 71(3) EPC dated Mar. 10, 2026, from European Patent Application No. 24159778.0, 7 pp.
Decision of Reexamination dated Apr. 4, 2020, from Chinese Patent Application No. 201480029735.5, 18 pp.
Examiner's Report dated Apr. 17, 2025, from Canadian Patent Application No. 3,171,803, 3 pp.
Google Search Log cited by U.S. Patent Office in Notice of Allowance for U.S. Appl. No. 19/007,296, 3 pp. (2026).
Hearing Notice Received dated Oct. 25, 2023, from Indian Application No. 201647042695, 3 pp.
Intimation of grant dated Oct. 11, 2023, from Indian Patent Application No. 201747008352, 1 p.
Invitation pursuant to Rule 137(4) EPC and Article 94(3) EPC dated Dec. 2, 2025, form European Patent Application No. 20177289.4, 2 pp.
Norkin et al., "HEVC Deblocking Filtering and Decisions," SPIE Optical Engineering + Applications, 8 pp. (2012).
Notice of Allowance dated Oct. 1, 2024, from U.S. Appl. No. 17/390,570, 14 pp.
Notice of Allowance dated Oct. 21, 2024, from U.S. Appl. No. 17/691,802, 14 pp.
Notice of Allowance dated Dec. 3, 2024, from Korean Patent Application No. 10-2023-7030245, 8 pp.
Notice of Allowance dated Jan. 29, 2025, from U.S. Appl. No. 18/632,052, 5 pp.
Notice of Allowance dated Mar. 26, 2025, from U.S. Appl. No. 18/620,604, 9 pp.
Notice of Allowance dated May 13, 2025, from U.S. Appl. No. 18/404,749, 14 pp.
Notice of Allowance dated Nov. 24, 2025, from U.S. Appl. No. 18/792,374, 7 pp.
Notice of Allowance dated Jan. 27, 2026, from U.S. Appl. No. 17/994,804, 12 pp.

Notice of Allowance dated Apr. 13, 2026, from U.S. Appl. No. 19/007,296, 9 pp.
Office Action dated Dec. 3, 2024, from U.S. Appl. No. 18/404,749, 26 pp.
Office Action dated Dec. 3, 2024, from U.S. Appl. No. 18/620,604, 8 pp.
Office Action dated Jul. 22, 2025, from U.S. Appl. No. 18/792,374, 10 pp.
Office Action dated Mar. 16, 2026, from U.S. Appl. No. 19/028,032, 8 pp.
Office Action dated Mar. 24, 2026, from U.S. Appl. No. 19/090,156, 10 pp.
Office Action dated Mar. 24, 2026, from U.S. Appl. No. 19/090,180, 10 pp.
Office Action dated Mar. 26, 2026, from U.S. Appl. No. 19/093,437, 10 pp.
Office Action dated Mar. 30, 2026, from U.S. Appl. No. 19/092,898, 9 pp.
Office Action dated Mar. 30, 2026, from U.S. Appl. No. 19/090,225, 10 pp.
Office Action dated Apr. 8, 2026, from U.S. Appl. No. 19/092,858, 13 pp.
Office Action dated Apr. 8, 2026, from U.S. Appl. No. 19/092,954, 13 pp.
Xu et al., "On Unification of Intra Block and Inter-picture Motion Compensation," JCTVC-Q0132, v5, 14 pp. (Jan. 2014).
Communication pursuant to Article 94(3) EPC dated Apr. 8, 2026, from European Patent Application No. 22182574.8, 8 pp.
Notice of Allowance dated Apr. 15, 2026, from U.S. Appl. No. 19/090,204, 11 pp.
Notice of Allowance dated May 11, 2026, from U.S. Appl. No. 19/093,437, 6 pp.
Notice of Allowance dated May 13, 2026, from U.S. Appl. No. 19/093,411, 11 pp.
Office Action dated Apr. 20, 2026, from U.S. Appl. No. 19/092,988, 7 pp.
Office Action dated Apr. 29, 2026, from U.S. Appl. No. 19/089,845, 11 p.
Office Action dated Apr. 29, 2026, from U.S. Appl. No. 19/089,900, 11 pp.
Office Action dated Apr. 29, 2026, from U.S. Appl. No. 19/090,011, 9 pp.
Office Action dated Apr. 30, 2026, from U.S. Appl. No. 19/089,953, 11 pp.
Office Action dated Apr. 30, 2026, from U.S. Appl. No. 19/090,056, 11 pp.

* cited by examiner software 180 implementing one or more innovations
for rules for intra-picture prediction modes when
wavefront parallel processing (WPP) is enabled

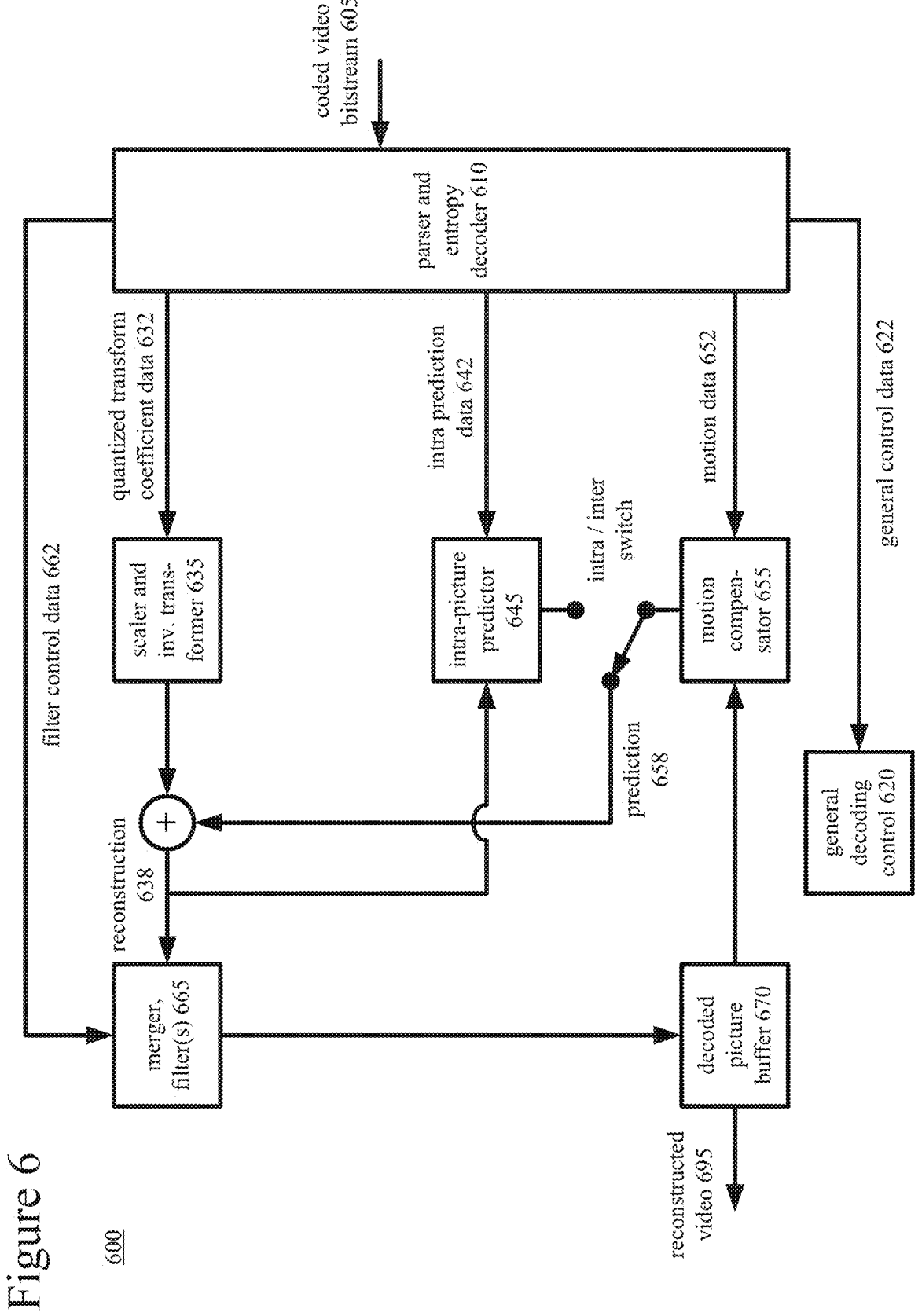

coded video bitstream 605 parser and entropy decoder 610 quantized transform coefficient data 632 intra prediction data 642 motion data 652 general control data 622 filter control data 662 scaler and inv. trans-former 635 intra-picture predictor 645 intra / inter switch motion compen-sator 655 general decoding control 620 reconstruction 638 prediction 658 merger, filter(s) 665 decoded picture buffer 670 reconstructed video 695

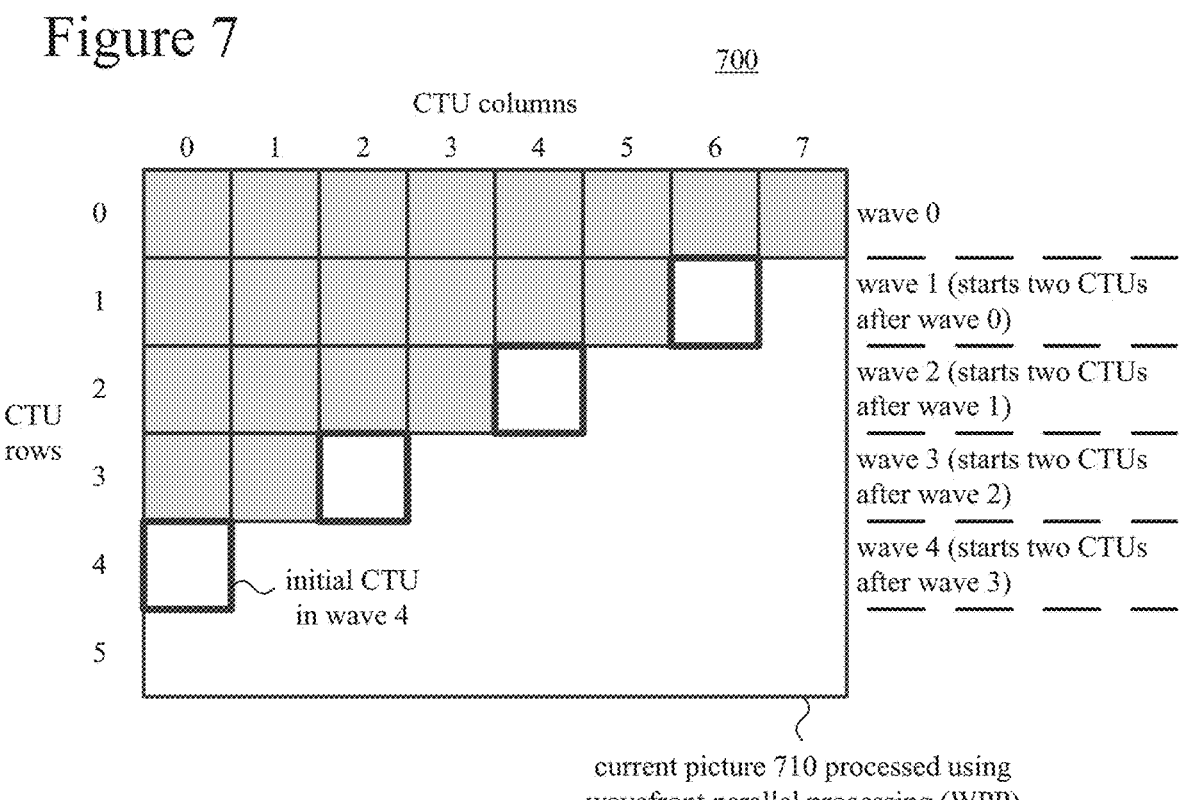

CTU columns

CTU rows wave 0 wave 1 (starts two CTUs after wave 0)

wave 2 (starts two CTUs after wave 1)

wave 3 (starts two CTUs after wave 2)

wave 4 (starts two CTUs after wave 3)

initial CTU in wave 4 current picture 710 processed using wavefront parallel processing (WPP)

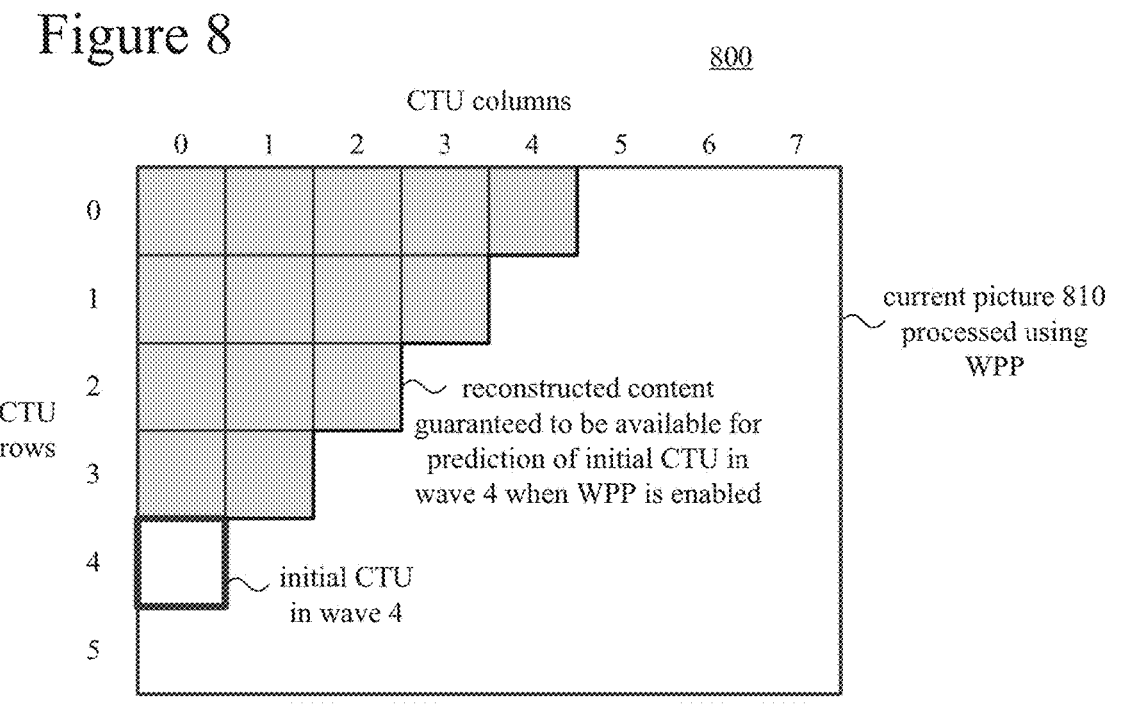

CTU columns

CTU rows current picture 810 processed using WPP reconstructed content guaranteed to be available for prediction of initial CTU in wave 4 when WPP is enabled initial CTU in wave 4

Figure 9                                          900
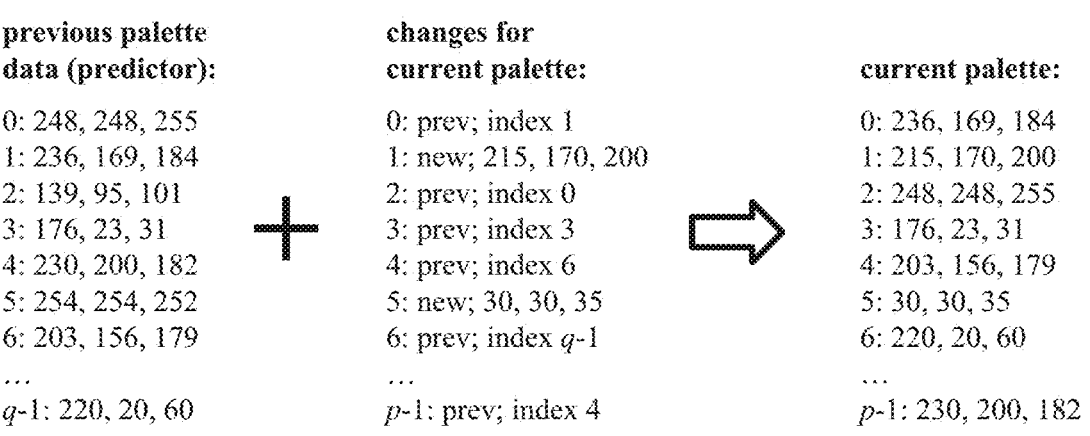
previous palette
data (predictor):
0: 248, 248, 255
1: 236, 169, 184
2: 139, 95, 101
3: 176, 23, 31
4: 230, 200, 182
5: 254, 254, 252
6: 203, 156, 179
...
q-1: 220, 20, 60
changes for
current palette:
0: prev; index 1
1: new; 215, 170, 200
2: prev; index 0
3: prev; index 3
4: prev; index 6
5: new; 30, 30, 35
6: prev; index q-1
...
p-1: prev; index 4
current palette:
0: 236, 169, 184
1: 215, 170, 200
2: 248, 248, 255
3: 176, 23, 31
4: 203, 156, 179
5: 30, 30, 35
6: 220, 20, 60
...
p-1: 230, 200, 182
Figure 10                                         1000
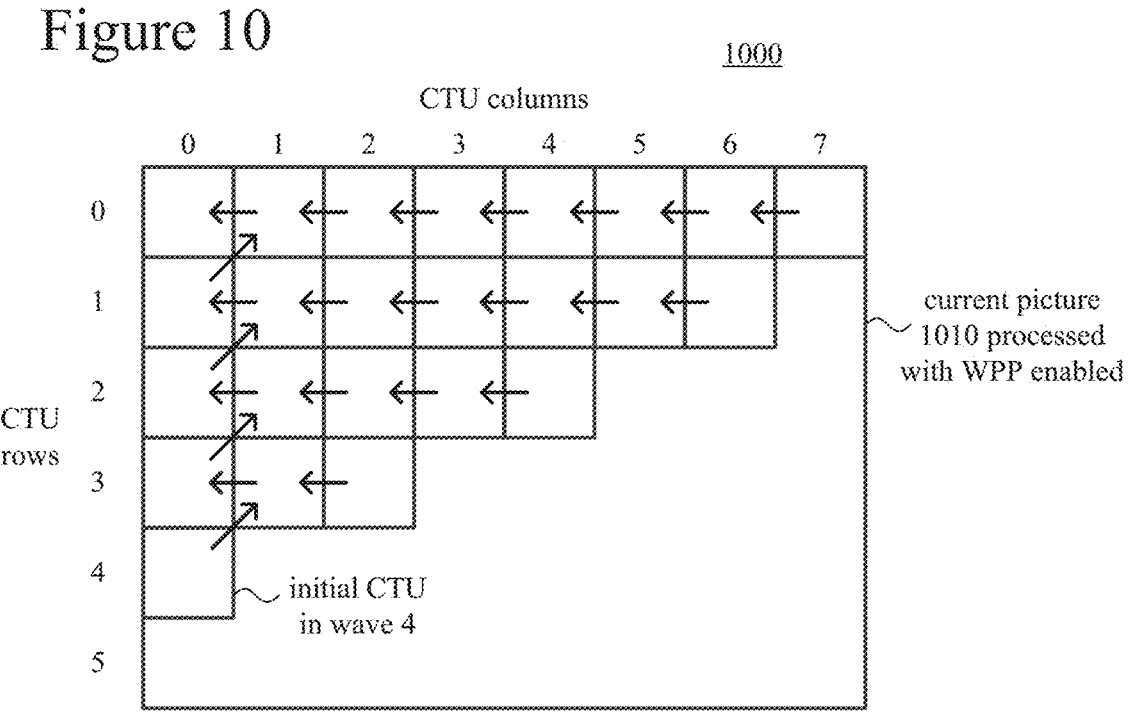
direction of palette prediction when WPP is enabled:
- for initial CU in first CTU row -- none
- for initial CU in later CTU rows -- above-right, following arrows
- otherwise -- left, following arrows

Figure 11    1100

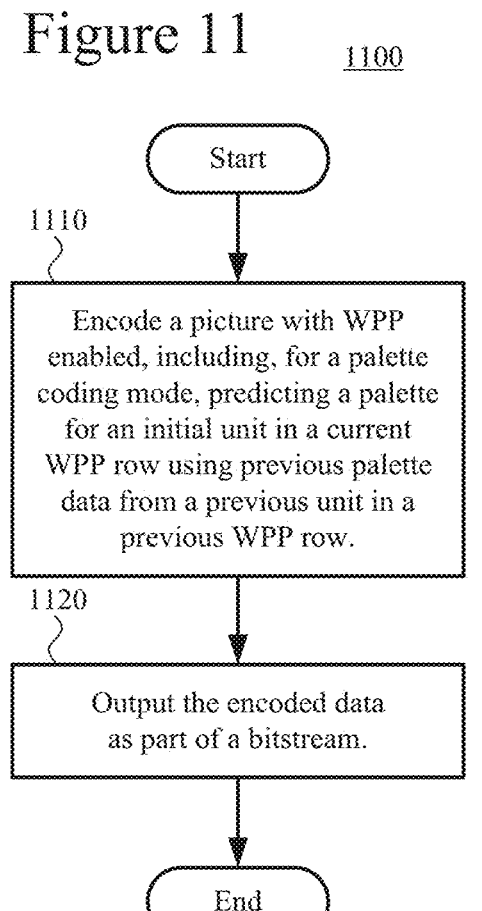

Start

1110

Encode a picture with WPP enabled, including, for a palette coding mode, predicting a palette for an initial unit in a current WPP row using previous palette data from a previous unit in a previous WPP row.

1120

Output the encoded data as part of a bitstream.

End

Figure 12    1200

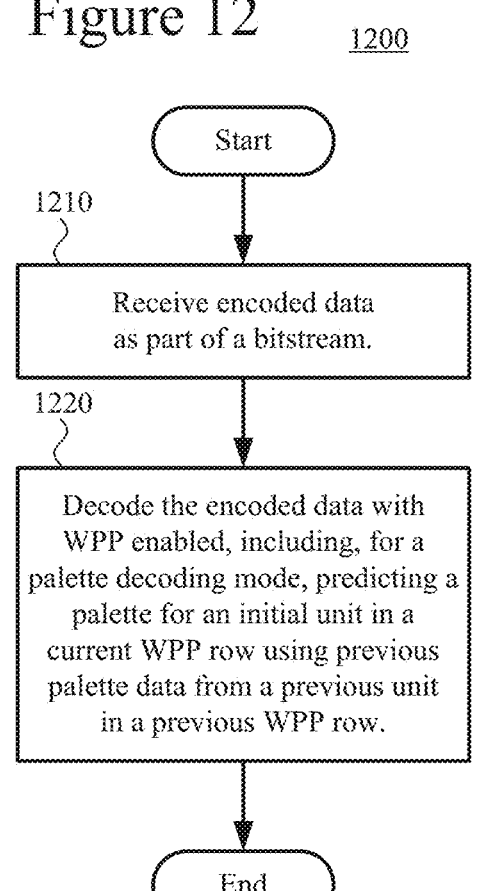

Start

1210

Receive encoded data as part of a bitstream.

1220

Decode the encoded data with WPP enabled, including, for a palette decoding mode, predicting a palette for an initial unit in a current WPP row using previous palette data from a previous unit in a previous WPP row.

End

1300 intra block copy mode current
picture
1310

1340

1350

1330 block vector (1340) for current block (1330) of current picture (1310), indicating a
displacement to a reference block (1350) in the current picture (1310)

1400

1442    1441

1444 reconstructed
content

1443 not-yet-coded
content current
block 1430 current
picture
1410 block vectors (1441, 1442, 1443, 1444) indicating
displacements to candidate reference blocks for current
block (1430) of current picture (1410)

Figure 17
1700
z-scan order for current unit and units that may include bottom right position of the reference region
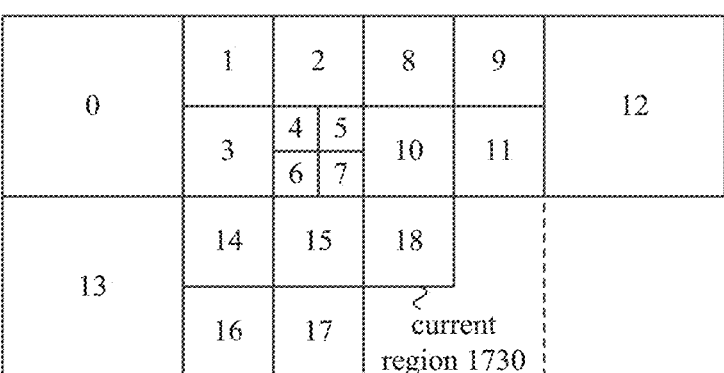
Figure 19
1900
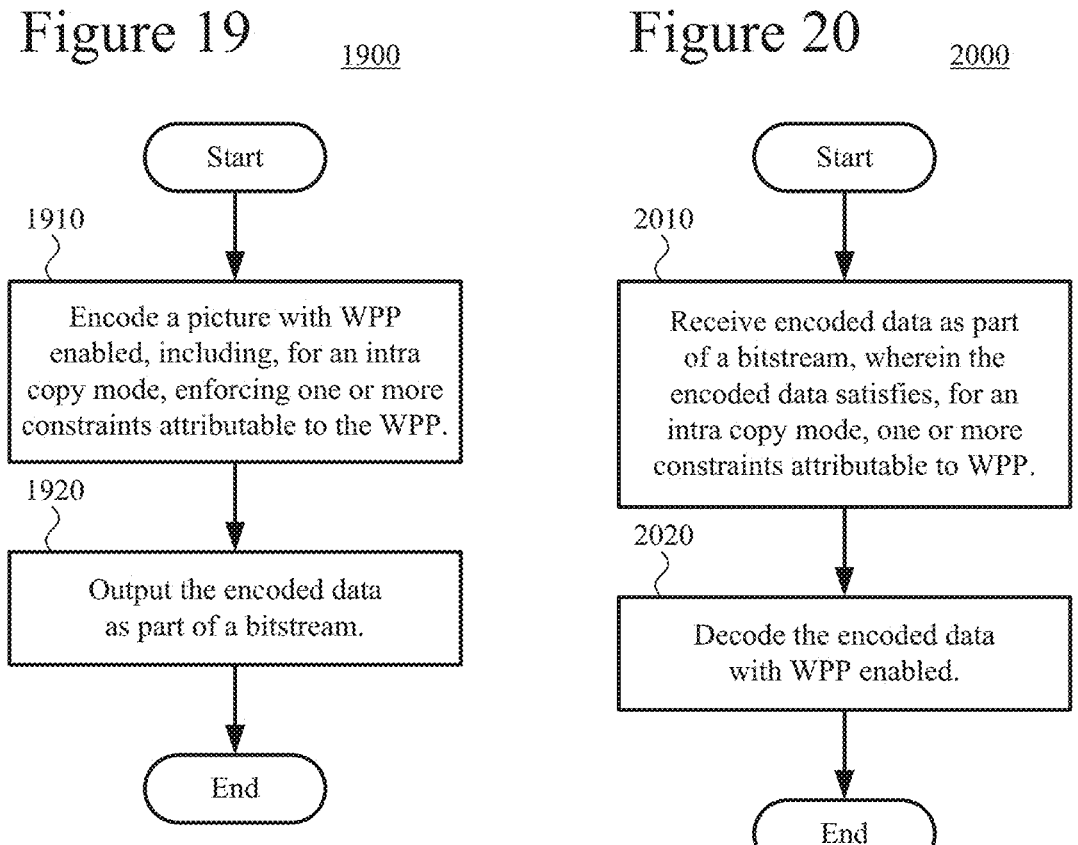
Figure 20
2000

RULES FOR INTRA-PICTURE PREDICTION MODES WHEN WAVEFRONT PARALLEL PROCESSING IS ENABLED

CROSS REFERENCE TO RELATED APPLICATIONS

This application is a continuation of U.S. patent application Ser. No. 18/218,796, filed Jul. 6, 2023, which is a continuation of U.S. patent application Ser. No. 17/739,299, filed May 9, 2022, now U.S. Pat. No. 11,758,162, which is a continuation of U.S. patent application Ser. No. 17/009, 495, filed Sep. 1, 2020, now U.S. Pat. No. 11,363,283, which is a continuation of U.S. patent application Ser. No. 15/515, 559, filed Mar. 29, 2017, now U.S. Pat. No. 10,812,817, which is the U.S. National Stage of International Application No. PCT/CN2014/087885, filed Sep. 30, 2014, which was published in English under PCT Article 21 (2), and which is incorporated by reference herein in its entirety.

BACKGROUND

Engineers use compression (also called source coding or source encoding) to reduce the bit rate of digital video. Compression decreases the cost of storing and transmitting video information by converting the information into a lower bit rate form. Decompression (also called decoding) reconstructs a version of the original information from the compressed form. A "codec" is an encoder/decoder system.

Over the last 25 years, various video codec standards have been adopted, including the ITU-T H.261, H.262 (MPEG-2 or ISO/IEC 13818-2), H.263 and H.264 (MPEG-4 AVC or ISO/IEC 14496-10) standards, the MPEG-1 (ISO/IEC 11172-2) and MPEG-4 Visual (ISO/IEC 14496-2) standards, and the SMPTE 421M (VC-1) standard. More recently, the H.265/HEVC standard (ITU-T H.265 or ISO/IEC 23008-2) has been approved. Extensions to the H.265/HEVC standard (e.g., for scalable video coding/decoding, for coding/decoding of video with higher fidelity in terms of sample bit depth or chroma sampling rate, for screen capture content, or for multi-view coding/decoding) are currently under development. A video codec standard typically defines options for the syntax of an encoded video bitstream, detailing parameters in the bitstream when particular features are used in encoding and decoding. In many cases, a video codec standard also provides details about the decoding operations a decoder should perform to achieve conforming results in decoding. Aside from codec standards, various proprietary codec formats define other options for the syntax of an encoded video bitstream and corresponding decoding operations.

Wavefront parallel processing ("WPP") is a tool available for encoding and decoding in the H.265/HEVC standard. When WPP is enabled, a portion of a picture is divided into rows of special sections called coding tree units ("CTUs"). During encoding or decoding, the first row of CTUs can be processed CTU-after-CTU, from left to right. Processing (encoding or decoding) of the second rows of CTUs need not wait for completion of processing for the first row of CTUs. Instead, processing of the second row can begin after processing completes for several of the first row's CTUs, which provide information used when processing the initial CTU of the second row. Similarly, processing of the third row of CTUs can begin after processing completes for several of the second row's CTUs. WPP facilitates parallel processing of different rows of CTUs. Different threads or processing cores can perform the processing for different rows of CTUs on a staggered, time-delayed basis.

Intra block copy ("BC") is a prediction mode under development for H.265/HEVC extensions. For intra BC prediction mode, the sample values of a current block of a picture are predicted using previously reconstructed sample values in the same picture. A block vector ("BV") indicates a displacement from the current block to a reference block of the picture that includes the previously reconstructed sample values used for prediction. The BV is signaled in the bitstream. Intra BC prediction is a form of intra-picture prediction-intra BC prediction for a block of a picture does not use any sample values other than sample values in the same picture. Intra string copy ("SC") mode and intra line copy ("LC") mode are other examples of intra-picture prediction modes, which, like intra BC mode, use an offset value to indicate a displacement to a position in the previously reconstructed sample values used for prediction. A palette prediction mode, which is another example of intra-picture prediction mode, predicts a palette used to represent the colors in a section such as a coding unit ("CU"). As currently specified for extensions to the H.265/HEVC standard, various intra-picture prediction modes are not effectively used when WPP is enabled.

SUMMARY

In summary, the detailed description presents innovations in rules enforced for intra-picture prediction modes when wavefront parallel processing ("WPP") is enabled. A syntax element in a bitstream can indicate whether WPP is enabled for a video sequence, set of pictures or picture. The innovations facilitate the use of intra-picture prediction modes such as palette prediction mode, intra block copy mode, intra line copy mode and intra string copy mode by an encoder or decoder when WPP is enabled.

According to one aspect of the innovations described herein, an encoder encodes a picture with WPP enabled. The encoding produces encoded data. For a palette coding mode, the encoder predicts a palette for an initial unit in a current WPP row of the picture using previous palette data from a previous unit in a previous WPP row of the picture. The encoder outputs the encoded data as part of a bitstream.

A corresponding decoder receives encoded data as part of a bitstream. The decoder decodes the encoded data with WPP enabled. The decoding reconstructs a picture. For a palette decoding mode, the decoder predicts a palette for an initial unit in a current WPP row of the picture using previous palette data from a previous unit in a previous WPP row of the picture.

According to another aspect of the innovations described herein, an encoder encodes a picture with WPP enabled. The encoding produces encoded data. For an intra copy mode (e.g., intra block copy mode, intra string copy mode, intra line copy mode), the encoder enforces one or more constraints attributable to the WPP. The encoder outputs the encoded data as part of a bitstream.

A corresponding decoder receives encoded data as part of a bitstream. For an intra copy mode (e.g., intra block copy mode, intra string copy mode, intra line copy mode), the encoded data satisfies one or more constraints attributable to WPP. The decoder decodes the encoded data with the WPP enabled. The decoding reconstructs a picture.

The innovations can be implemented as part of a method, as part of a computing system configured to perform the method or as part of a tangible computer-readable media storing computer-executable instructions for causing a computing system to perform the method. The various innovations can be used in combination or separately. This summary is provided to introduce a selection of concepts in a simplified form that are further described below in the detailed description. This summary is not intended to identify key features or essential features of the claimed subject matter, nor is it intended to be used to limit the scope of the claimed subject matter. The foregoing and other objects, features, and advantages of the invention will become more apparent from the following detailed description, which proceeds with reference to the accompanying figures.

BRIEF DESCRIPTION OF THE DRAWINGS

FIG. 6 is a diagram illustrating an example video decoder in conjunction with which some described embodiments can be implemented.

FIG. 7 is a diagram illustrating the timing of WPP, and FIG. 8 is a diagram illustrating reconstructed content that can be used for prediction when WPP is enabled.

FIGS. 9 and 10 are diagrams illustrating aspects of palette prediction, according to some described embodiments.

FIGS. 11 and 12 are flowcharts illustrating encoding and decoding, respectively, with palette prediction, when WPP is enabled, according to some described embodiments.

FIGS. 15 and 16 are diagrams illustrating aspects of examples of intra line copy prediction and intra string copy prediction, respectively.

FIG. 17 is a diagram illustrating example z-scan order for units of a picture.

FIGS. 19 and 20 are flowcharts illustrating encoding and decoding, respectively, with rules enforced for intra copy mode when WPP is enabled, according to some described embodiments.

DETAILED DESCRIPTION

Figure 1:
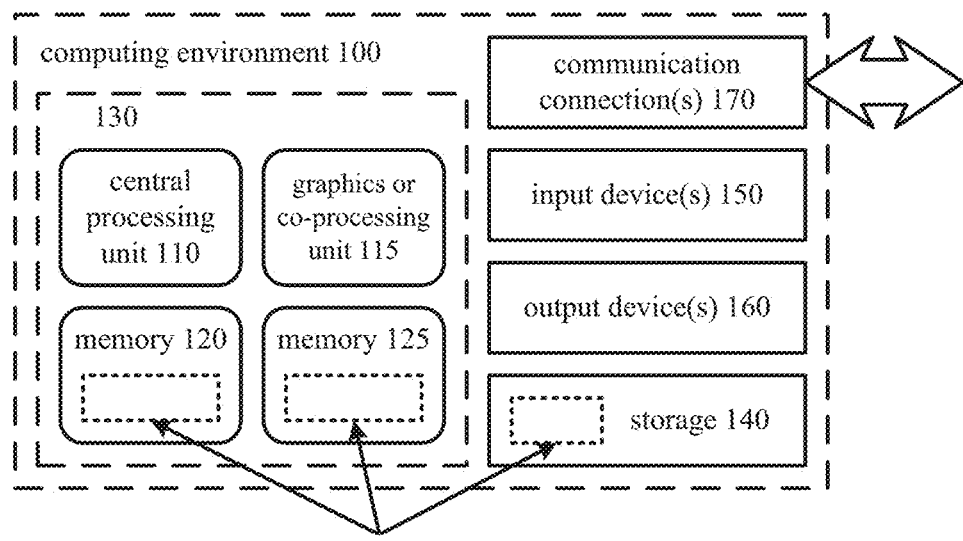
FIG. 1 is a diagram of an example computing system in which some described embodiments can be implemented.

The detailed description presents innovations in rules enforced for intra-picture prediction modes when wavefront parallel processing ("WPP") is enabled. For example, some of the innovations relate to prediction of palettes for a palette coding/decoding mode when WPP is enabled. Other innovations relate to constraints enforced during an intra copy mode (such as intra block copy mode, intra line copy mode or intra string copy mode) when WPP is enabled. The innovations facilitate the use of intra-picture prediction modes by an encoder or decoder when WPP is enabled.

Although operations described herein are in places described as being performed by a video encoder or video decoder, in many cases the operations can be performed by another type of media processing tool (e.g., image encoder or image decoder).

Some of the innovations described herein are illustrated with reference to terms specific to extensions of the H.265/HEVC standard. For example, reference is made to the draft version JCTVC-R1005 of the screen content coding/decoding extensions for the H.265/HEVC standard—"High Efficiency Video Coding (HEVC) Screen Content Coding: Draft 1," JCTVC-R1005_v2, August 2014. The innovations described herein can also be implemented for other standards or formats.

Many of the innovations described herein can improve rate-distortion performance when encoding certain "artificially-created" video content such as screen capture content. In general, screen capture video (also called screen content video) is video that contains rendered text, computer graphics, animation-generated content or other similar types of content captured when rendered to a computer display, as opposed to camera-captured video content only. Screen capture content typically includes repeated structures (e.g., graphics, text characters). Screen capture content is usually encoded in a format (e.g., YUV 4:4:4 or RGB 4:4:4) with high chroma sampling resolution, although it may also be encoded in a format with lower chroma sampling resolution (e.g., YUV 4:2:0). Common scenarios for encoding/decoding of screen capture content include remote desktop conferencing and encoding/decoding of graphical overlays on natural video or other "mixed content" video. Several of the innovations described herein are adapted for encoding of screen content video or other artificially-created video. These innovations can also be used for natural video, but may not be as effective.

More generally, various alternatives to the examples described herein are possible. For example, some of the methods described herein can be altered by changing the ordering of the method acts described, by splitting, repeating, or omitting certain method acts, etc. The various aspects of the disclosed technology can be used in combination or separately. Different embodiments use one or more of the described innovations. Some of the innovations described herein address one or more of the problems noted in the background. Typically, a given technique/tool does not solve all such problems.

I. Example Computing Systems.

FIG. 1 illustrates a generalized example of a suitable computing system (100) in which several of the described innovations may be implemented. The computing system (100) is not intended to suggest any limitation as to scope of use or functionality, as the innovations may be implemented in diverse general-purpose or special-purpose computing systems.

With reference to FIG. 1, the computing system (100) includes one or more processing units (110, 115) and memory (120, 125). The processing units (110, 115) execute computer-executable instructions. A processing unit can be a general-purpose central processing unit ("CPU"), processor in an application-specific integrated circuit ("ASIC") or any other type of processor. In a multi-processing system, multiple processing units execute computer-executable instructions to increase processing power. For example, FIG. 1 shows a central processing unit (110) as well as a graphics processing unit or co-processing unit (115). The tangible memory (120, 125) may be volatile memory (e.g., registers, cache, RAM), non-volatile memory (e.g., ROM, EEPROM, flash memory, etc.), or some combination of the two, accessible by the processing unit(s). The memory (120, 125) stores software (180) implementing one or more innovations for rules enforced for intra-picture prediction modes when WPP is enabled, in the form of computer-executable instructions suitable for execution by the processing unit(s).

A computing system may have additional features. For example, the computing system (100) includes storage (140), one or more input devices (150), one or more output devices (160), and one or more communication connections (170). An interconnection mechanism (not shown) such as a bus, controller, or network interconnects the components of the computing system (100). Typically, operating system software (not shown) provides an operating environment for other software executing in the computing system (100), and coordinates activities of the components of the computing system (100).

The tangible storage (140) may be removable or non-removable, and includes magnetic disks, magnetic tapes or cassettes, CD-ROMs, DVDs, or any other medium which can be used to store information and which can be accessed within the computing system (100). The storage (140) stores instructions for the software (180) implementing one or more innovations for rules enforced for intra-picture prediction modes when WPP is enabled.

The input device(s) (150) may be a touch input device such as a keyboard, mouse, pen, or trackball, a voice input device, a scanning device, or another device that provides input to the computing system (100). For video, the input device(s) (150) may be a camera, video card, TV tuner card, screen capture module, or similar device that accepts video input in analog or digital form, or a CD-ROM or CD-RW that reads video input into the computing system (100). The output device(s) (160) may be a display, printer, speaker, CD-writer, or another device that provides output from the computing system (100).

The communication connection(s) (170) enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system (100), computer-readable media include memory (120, 125), storage (140), and combinations of any of the above.

The innovations can be described in the general context of computer-executable instructions, such as those included in program modules, being executed in a computing system on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

The disclosed methods can also be implemented using specialized computing hardware configured to perform any of the disclosed methods. For example, the disclosed methods can be implemented by an integrated circuit (e.g., an ASIC such as an ASIC digital signal processor ("DSP"), a graphics processing unit ("GPU"), or a programmable logic device ("PLD") such as a field programmable gate array ("FPGA")) specially designed or configured to implement any of the disclosed methods.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

II. Example Network Environments.

Figure 2A:
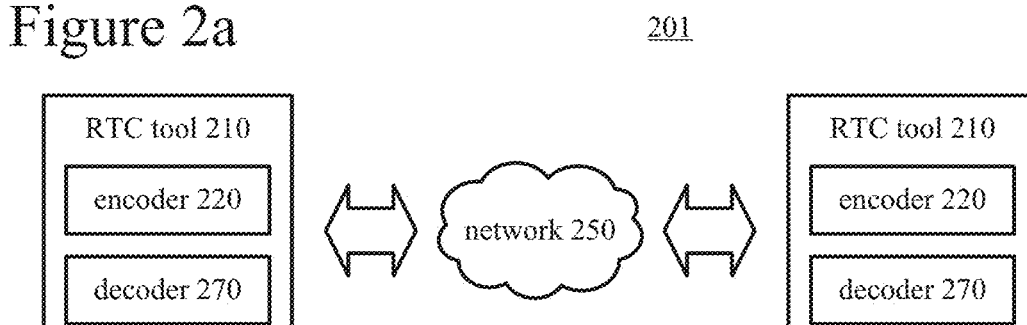
FIGS. 2a and 2b are diagrams of example network environments in which some described embodiments can be implemented.
Figure 2B:
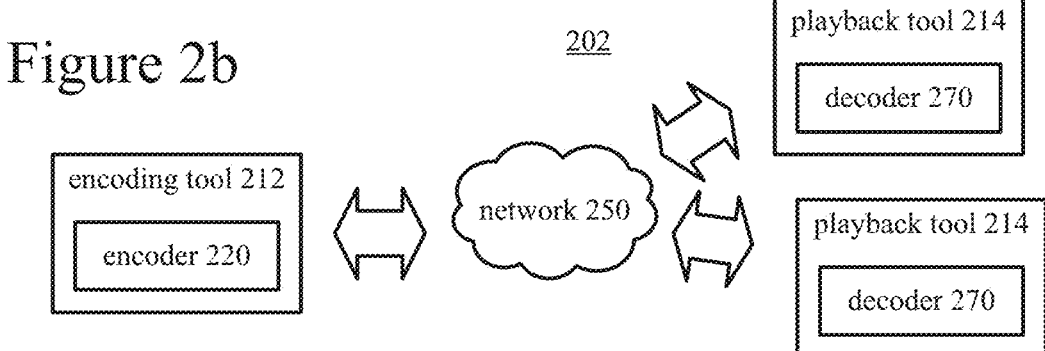

FIGS. 2a and 2b show example network environments (201, 202) that include video encoders (220) and video decoders (270). The encoders (220) and decoders (270) are connected over a network (250) using an appropriate communication protocol. The network (250) can include the Internet or another computer network.

In the network environment (201) shown in FIG. 2a, each real-time communication ("RTC") tool (210) includes both an encoder (220) and a decoder (270) for bidirectional communication. A given encoder (220) can produce output compliant with a variation or extension of the H.265/HEVC standard, SMPTE 421M standard, ISO/IEC 14496-10 standard (also known as H.264 or AVC), another standard, or a proprietary format, with a corresponding decoder (270) accepting encoded data from the encoder (220). The bidirectional communication can be part of a video conference, video telephone call, or other two-party or multi-party communication scenario. Although the network environment (201) in FIG. 2a includes two real-time communication tools (210), the network environment (201) can instead include three or more real-time communication tools (210) that participate in multi-party communication.

Figure 3:
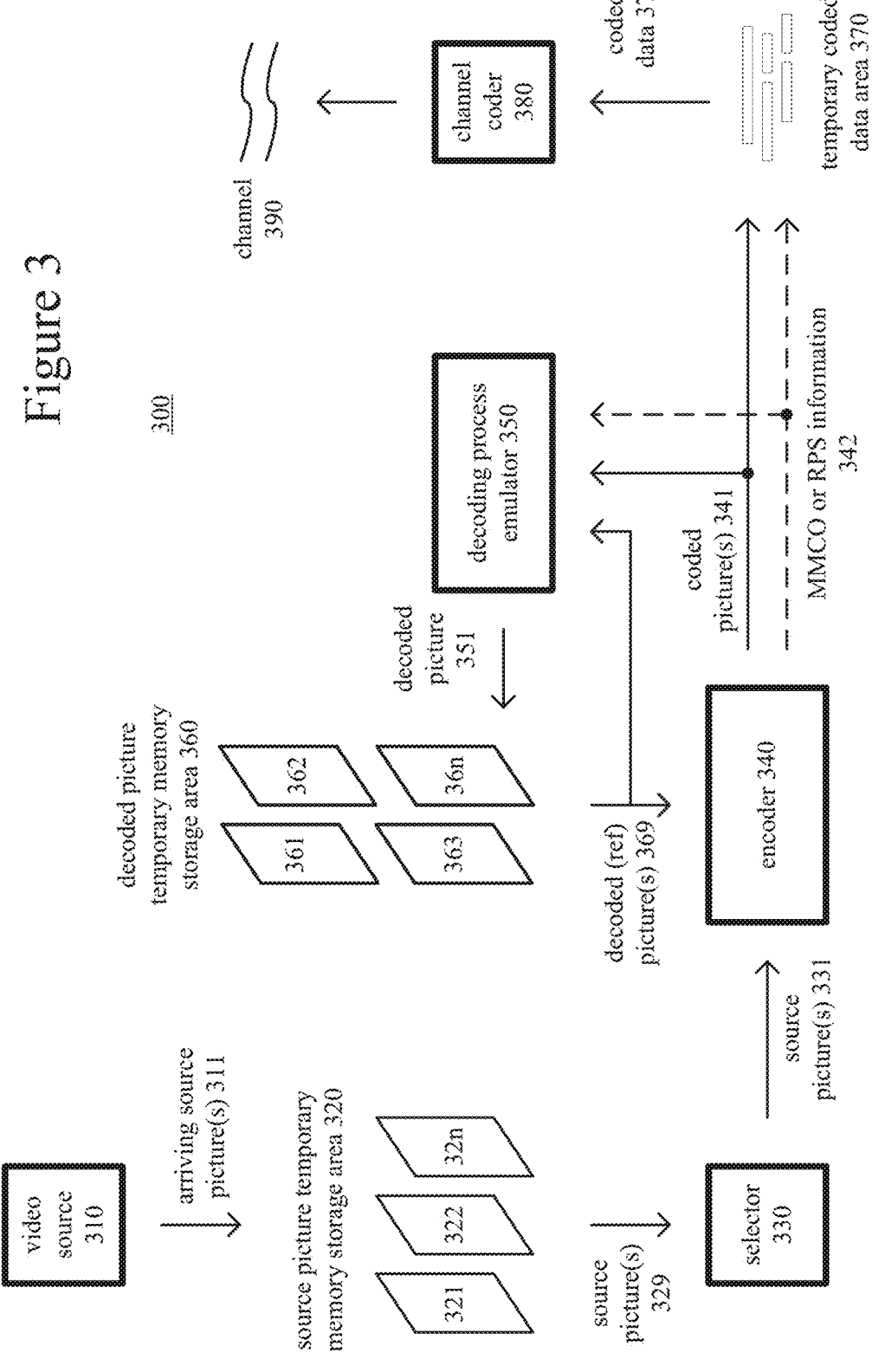
FIG. 3 is a diagram of an example encoder system in conjunction with which some described embodiments can be implemented.
Figure 4:
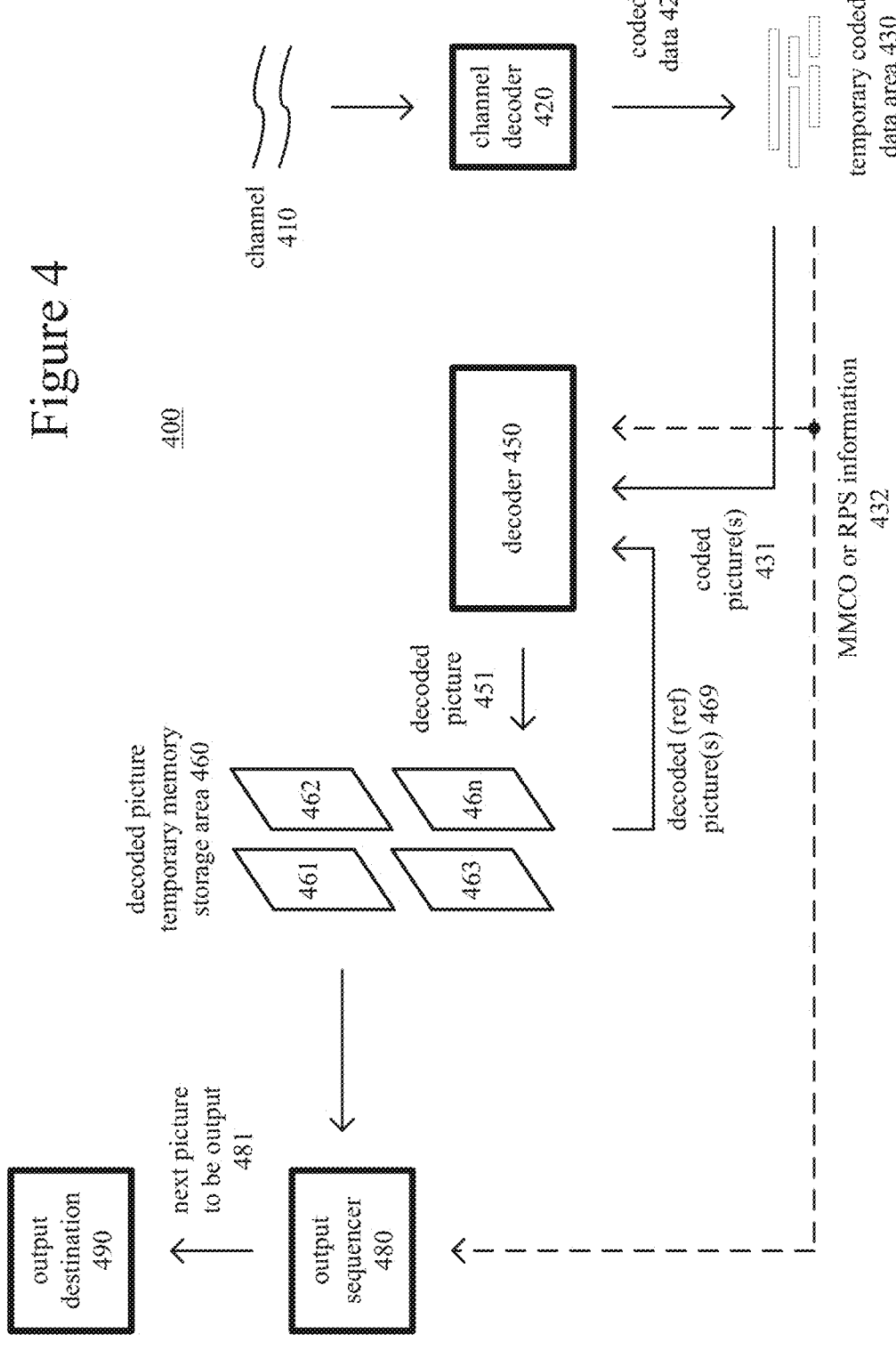
FIG. 4 is a diagram of an example decoder system in conjunction with which some described embodiments can be implemented.

A real-time communication tool (210) manages encoding by an encoder (220). FIG. 3 shows an example encoder system (300) that can be included in the real-time communication tool (210). Alternatively, the real-time communication tool (210) uses another encoder system. A real-time communication tool (210) also manages decoding by a decoder (270). FIG. 4 shows an example decoder system (400), which can be included in the real-time communication tool (210). Alternatively, the real-time communication tool (210) uses another decoder system.

In the network environment (202) shown in FIG. 2b, an encoding tool (212) includes an encoder (220) that encodes video for delivery to multiple playback tools (214), which include decoders (270). The unidirectional communication can be provided for a video surveillance system, web camera monitoring system, remote desktop conferencing presentation or other scenario in which video is encoded and sent from one location to one or more other locations. Although the network environment (202) in FIG. 2b includes two playback tools (214), the network environment (202) can include more or fewer playback tools (214). In general, a playback tool (214) communicates with the encoding tool (212) to determine a stream of video for the playback tool (214) to receive. The playback tool (214) receives the stream, buffers the received encoded data for an appropriate period, and begins decoding and playback.

FIG. 3 shows an example encoder system (300) that can be included in the encoding tool (212). Alternatively, the encoding tool (212) uses another encoder system. The encoding tool (212) can also include server-side controller logic for managing connections with one or more playback tools (214). FIG. 4 shows an example decoder system (400), which can be included in the playback tool (214). Alternatively, the playback tool (214) uses another decoder system. A playback tool (214) can also include client-side controller logic for managing connections with the encoding tool (212).

III. Example Encoder Systems.

FIG. 3 is a block diagram of an example encoder system (300) in conjunction with which some described embodiments may be implemented. The encoder system (300) can be a general-purpose encoding tool capable of operating in any of multiple encoding modes such as a low-latency encoding mode for real-time communication, a transcoding mode, and a higher-latency encoding mode for producing media for playback from a file or stream, or it can be a special-purpose encoding tool adapted for one such encoding mode. The encoder system (300) can be adapted for encoding of a particular type of content (e.g., screen capture content). The encoder system (300) can be implemented as part of an operating system module, as part of an application library, as part of a standalone application or using special-purpose hardware. Overall, the encoder system (300) receives a sequence of source video pictures (311) from a video source (310) and produces encoded data as output to a channel (390). The encoded data output to the channel can include content encoded using rules enforced for intra-picture prediction modes when WPP is enabled.

The video source (310) can be a camera, tuner card, storage media, screen capture module, or other digital video source. The video source (310) produces a sequence of video pictures at a frame rate of, for example, 30 frames per second. As used herein, the term "picture" generally refers to source, coded or reconstructed image data. For progressive-scan video, a picture is a progressive-scan video frame. For interlaced video, in example embodiments, an interlaced video frame might be de-interlaced prior to encoding. Alternatively, two complementary interlaced video fields are encoded together as a single video frame or encoded as two separately-encoded fields. Aside from indicating a progressive-scan video frame or interlaced-scan video frame, the term "picture" can indicate a single non-paired video field, a complementary pair of video fields, a video object plane that represents a video object at a given time, or a region of interest in a larger image. The video object plane or region can be part of a larger image that includes multiple objects or regions of a scene.

An arriving source picture (311) is stored in a source picture temporary memory storage area (320) that includes multiple picture buffer storage areas (321, 322, . . . , 32n). A picture buffer (321, 322, etc.) holds one source picture in the source picture storage area (320). After one or more of the source pictures (311) have been stored in picture buffers (321, 322, etc.), a picture selector (330) selects an individual source picture from the source picture storage area (320). The order in which pictures are selected by the picture selector (330) for input to the encoder (340) may differ from the order in which the pictures are produced by the video source (310), e.g., the encoding of some pictures may be delayed in order, so as to allow some later pictures to be encoded first and to thus facilitate temporally backward prediction. Before the encoder (340), the encoder system (300) can include a pre-processor (not shown) that performs pre-processing (e.g., filtering) of the selected picture (331) before encoding. The pre-processing can include color space conversion into primary (e.g., luma) and secondary (e.g., chroma differences toward red and toward blue) components and resampling processing (e.g., to reduce the spatial resolution of chroma components) for encoding. Before encoding, video may be converted to a color space such as YUV, in which sample values of a luma (Y) component represent brightness or intensity values, and sample values of chroma (U, V) components represent color-difference values. The precise definitions of the color-difference values (and conversion operations to/from YUV color space to another color space such as RGB) depend on implementation. In general, as used herein, the term YUV indicates any color space with a luma (or luminance) component and one or more chroma (or chrominance) components, including Y'UV, YIQ, Y'IQ and YDbDr as well as variations such as YCbCr and YCoCg. The chroma sample values may be sub-sampled to a lower chroma sampling rate (e.g., for YUV 4:2:0 format), or the chroma sample values may have the same resolution as the luma sample values (e.g., for YUV 4:4:4 format). Or, the video can be encoded in another format (e.g., RGB 4:4:4 format, GBR 4:4:4 format or BGR 4:4:4 format). In particular, screen content video may be encoded in RGB 4:4:4 format, GBR 4:4:4 format or BGR 4:4:4 format.

The encoder (340) encodes the selected picture (331) to produce a coded picture (341) and also produces memory management control operation ("MMCO") signals (342) or reference picture set ("RPS") information. The RPS is the set of pictures that may be used for reference in motion compensation for a current picture or any subsequent picture. If the current picture is not the first picture that has been encoded, when performing its encoding process, the encoder (340) may use one or more previously encoded/decoded pictures (369) that have been stored in a decoded picture temporary memory storage area (360). Such stored decoded pictures (369) are used as reference pictures for inter-picture prediction of the content of the current source picture (331). The MMCO/RPS information (342) indicates to a decoder which reconstructed pictures may be used as reference pictures, and hence should be stored in a picture storage area.

Generally, the encoder (340) includes multiple encoding modules that perform encoding tasks such as partitioning into tiles, intra-picture prediction estimation and prediction, motion estimation and compensation, frequency transforms, quantization and entropy coding. The exact operations performed by the encoder (340) can vary depending on compression format. The format of the output encoded data can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

The encoder (340) can partition a picture into multiple tiles of the same size or different sizes. For example, the encoder (340) splits the picture along tile rows and tile columns that, with picture boundaries, define horizontal and vertical boundaries of tiles within the picture, where each tile is a rectangular region. Tiles are often used to provide options for parallel processing. A picture can also be organized as one or more slices, where a slice can be an entire picture or section of the picture. A slice can be decoded independently of other slices in a picture, which improves error resilience. The content of a slice or tile is further partitioned into blocks or other sets of sample values for purposes of encoding and decoding. Rows of certain blocks (e.g., rows of coding tree units of a slice according to the H.265/HEVC standard) can be encoded in parallel using WPP, as further explained below.

For syntax according to the H.265/HEVC standard, the encoder splits the content of a picture (or slice or tile) into coding tree units. A coding tree unit ("CTU") includes luma sample values organized as a luma coding tree block ("CTB") and corresponding chroma sample values organized as two chroma CTBs. The size of a CTU (and its CTBs) is selected by the encoder. A luma CTB can contain, for example, 64×64, 32×32 or 16×16 luma sample values. A CTU includes one or more coding units. A coding unit ("CU") has a luma coding block ("CB") and two corresponding chroma CBs. For example, a CTU with a 64×64 luma CTB and two 64×64 chroma CTBs (YUV 4:4:4 format) can be split into four CUs, with each CU including a 32×32 luma CB and two 32×32 chroma CBs, and with each CU possibly being split further into smaller CUs. Or, as another example, a CTU with a 64×64 luma CTB and two 32×32 chroma CTBs (YUV 4:2:0 format) can be split into four CUs, with each CU including a 32×32 luma CB and two 16×16 chroma CBs, and with each CU possibly being split further into smaller CUs. The smallest allowable size of CU (e.g., 8×8, 16×16) can be signaled in the bitstream.

Generally, a CU has a prediction mode such as inter or intra. A CU includes one or more prediction units for purposes of signaling of prediction information (such as prediction mode details, displacement values, etc.) and/or prediction processing. A prediction unit ("PU") has a luma prediction block ("PB") and two chroma PBs. According to the H.265/HEVC standard, for an intra-predicted CU, the PU has the same size as the CU, unless the CU has the smallest size (e.g., 8×8). In that case, the CU can be split into four smaller PUs (e.g., each 4×4 if the smallest CU size is 8×8, for intra-picture prediction) or the PU can have the smallest CU size, as indicated by a syntax element for the CU. For symmetric or asymmetric partitions used in intra BC prediction, however, a larger CU can be split into multiple PUs.

A CU also has one or more transform units for purposes of residual coding/decoding, where a transform unit ("TU") has a luma transform block ("TB") and two chroma TBs. A PU in an intra-predicted CU may contain a single TU (equal in size to the PU) or multiple TUs. The encoder decides how to partition video into CTUs, CUs, PUs, TUs, etc.

In H.265/HEVC implementations, a slice can include a single slice segment (independent slice segment) or be divided into multiple slice segments (independent slice segment and one or more dependent slice segments). A slice segment is an integer number of CTUs ordered consecutively in a tile scan, contained in a single network abstraction layer ("NAL") unit. For an independent slice segment, a slice segment header includes values of syntax elements that apply for the independent slice segment. For a dependent slice segment, a truncated slice segment header includes a few values of syntax elements that apply for that dependent slice segment, and the values of the other syntax elements for the dependent slice segment are inferred from the values for the preceding independent slice segment in decoding order.

As used herein, the term "block" can indicate a macroblock, residual data unit, CB, PB or TB, or some other set of sample values, depending on context. The term "unit" can indicate a macroblock, CTU, CU, PU, TU or some other set of blocks, or it can indicate a single block, depending on context.

Returning to FIG. 3, the encoder represents an intra-coded block, line or string of a source picture (331) in terms of prediction from other, previously reconstructed sample values in the picture (331). For intra copy prediction, an intra-picture estimator estimates displacement from a current block, line or string to a position in the other, previously reconstructed sample values. A reference block, line or string of sample values in the picture are used to generate prediction values for the current block, line or string. For example, for intra block copy ("BC") prediction, an intra-picture estimator estimates displacement from a current block to a position in previously reconstructed sample values in the picture. A reference block is a block of sample values in the picture that provide BC-prediction values for the current block. The reference block can be indicated with a block vector ("BV") value (determined in BV estimation). As another example, for intra line copy ("LC") prediction, an intra-picture estimator estimates displacement from a current line (of a current block) to a position in previously reconstructed sample values in the picture. A reference line is a line of sample values in the picture that provide LC-prediction values for the current line. The reference line can be indicated with an offset value, which indicates the displacement from the current line to the reference line. As another example, for intra string copy ("SC") prediction, an intra-picture estimator estimates displacement from a current string (of a current block) to a position in previously reconstructed sample values in the picture. A reference string is a series of sample values in the picture that are used to generate SC-prediction values for the current string. The reference string can be indicated with an offset value (indicating the displacement from the current string to the reference string) and a string length value. Depending on implementation, the encoder can perform offset estimation for a block, line or string using input sample values or reconstructed sample values (previously encoded sample values in the same picture). When WPP is enabled, the intra-picture estimator can determine displacements (e.g., for BV values in intra BC prediction or for offset values in intra SC prediction or intra LC prediction) consistent with constraints on locations of reference regions, as explained below.

For intra spatial prediction for a block, the intra-picture estimator estimates extrapolation of the neighboring reconstructed sample values into the block.

The intra-picture estimator can output prediction information (such as BV values for intra BC prediction, offset values for intra LC prediction or intra SC prediction, or prediction mode (direction) for intra spatial prediction), which is entropy coded. An intra-picture prediction predictor applies the prediction information to determine intra prediction values.

For a palette coding mode, the encoder (340) represents at least some of the sample values of a CU or other unit using a palette. The palette represents colors used in the unit. For example, the palette maps index values 0, 1, 2, . . . , p to corresponding colors. During encoding of the unit, appropriate index values replace sample values at positions in the unit. A rare value in the unit can be encoded using an escape code value and literal values, instead of using an index value in the palette. The palette can change from unit to unit, and information specifying the palettes can be signaled in the bitstream.

The encoder (340) represents an inter-picture coded, predicted block of a source picture (331) in terms of prediction from reference pictures. A motion estimator estimates the motion of the block with respect to one or more reference pictures (369). When multiple reference pictures are used, the multiple reference pictures can be from different temporal directions or the same temporal direction. A motion-compensated prediction reference region is a region of sample values in the reference picture(s) that are used to generate motion-compensated prediction values for a block of sample values of a current picture. The motion estimator outputs motion information such as motion vector ("MV") information, which is entropy coded. A motion compensator applies MVs to reference pictures (369) to determine motion-compensated prediction values for inter-picture prediction.

The encoder can determine the differences (if any) between a block's prediction values (intra or inter) and corresponding original values. These prediction residual values are further encoded using a frequency transform (if the frequency transform is not skipped), quantization and entropy encoding. For example, the encoder (340) sets values for quantization parameter ("QP") for a picture, tile, slice and/or other portion of video, and quantizes transform coefficients accordingly. The entropy coder of the encoder (340) compresses quantized transform coefficient values as well as certain side information (e.g., MV information, BV information, QP values, mode decisions, parameter choices). Typical entropy coding techniques include Exponential-Golomb coding, Golomb-Rice coding, arithmetic coding, differential coding, Huffman coding, run length coding, variable-length-to-variable-length ("V2V") coding, variable-length-to-fixed-length ("V2F") coding, Lempel-Ziv ("LZ") coding, dictionary coding, probability interval partitioning entropy coding ("PIPE"), and combinations of the above. The entropy coder can use different coding techniques for different kinds of information, can apply multiple techniques in combination (e.g., by applying Golomb-Rice coding followed by arithmetic coding), and can choose from among multiple code tables within a particular coding technique. In some implementations, the frequency transform can be skipped. In this case, prediction residual values can be quantized and entropy coded. When the palette coding mode is used, the entropy coder can encode palette data. The encoder (340) can use palette prediction as explained below.

An adaptive deblocking filter is included within the motion compensation loop (that is, "in-loop" filtering) in the encoder (340) to smooth discontinuities across block boundary rows and/or columns in a decoded picture. Other filtering (such as de-ringing filtering, adaptive loop filtering ("ALF"), or sample-adaptive offset ("SAO") filtering; not shown) can alternatively or additionally be applied as in-loop filtering operations.

The encoded data produced by the encoder (340) includes syntax elements for various layers of bitstream syntax. For syntax according to the H.265/HEVC standard, for example, a picture parameter set ("PPS") is a syntax structure that contains syntax elements that may be associated with a picture. A PPS can be used for a single picture, or a PPS can be reused for multiple pictures in a sequence. A PPS is typically signaled separate from encoded data for a picture (e.g., one network abstraction layer ("NAL") unit for a PPS, and one or more other NAL units for encoded data for a picture). Within the encoded data for a picture, a syntax element indicates which PPS to use for the picture. Similarly, for syntax according to the H.265/HEVC standard, a sequence parameter set ("SPS") is a syntax structure that contains syntax elements that may be associated with a sequence of pictures. A bitstream can include a single SPS or multiple SPSs. An SPS is typically signaled separate from other data for the sequence, and a syntax element in the other data indicates which SPS to use.

The coded pictures (341) and MMCO/RPS information (342) (or information equivalent to the MMCO/RPS information (342), since the dependencies and ordering structures for pictures are already known at the encoder (340)) are processed by a decoding process emulator (350). The decoding process emulator (350) implements some of the functionality of a decoder, for example, decoding tasks to reconstruct reference pictures. In a manner consistent with the MMCO/RPS information (342), the decoding processes emulator (350) determines whether a given coded picture (341) needs to be reconstructed and stored for use as a reference picture in inter-picture prediction of subsequent pictures to be encoded. If a coded picture (341) needs to be stored, the decoding process emulator (350) models the decoding process that would be conducted by a decoder that receives the coded picture (341) and produces a corresponding decoded picture (351). In doing so, when the encoder (340) has used decoded picture(s) (369) that have been stored in the decoded picture storage area (360), the decoding process emulator (350) also uses the decoded picture(s) (369) from the storage area (360) as part of the decoding process.

The decoded picture temporary memory storage area (360) includes multiple picture buffer storage areas (361, 362, . . . , 36n). In a manner consistent with the MMCO/RPS information (342), the decoding process emulator (350) manages the contents of the storage area (360) in order to identify any picture buffers (361, 362, etc.) with pictures that are no longer needed by the encoder (340) for use as reference pictures. After modeling the decoding process, the decoding process emulator (350) stores a newly decoded picture (351) in a picture buffer (361, 362, etc.) that has been identified in this manner.

The coded pictures (341) and MMCO/RPS information (342) are buffered in a temporary coded data area (370). The coded data that is aggregated in the coded data area (370) contains, as part of the syntax of an elementary coded video bitstream, encoded data for one or more pictures. The coded data that is aggregated in the coded data area (370) can also include media metadata relating to the coded video data (e.g., as one or more parameters in one or more supplemental enhancement information ("SEI") messages or video usability information ("VUI") messages).

The aggregated data (371) from the temporary coded data area (370) is processed by a channel encoder (380). The channel encoder (380) can packetize and/or multiplex the aggregated data for transmission or storage as a media stream (e.g., according to a media program stream or transport stream format such as ITU-T H.222.0|ISO/IEC 13818-1 or an Internet real-time transport protocol format such as IETF RFC 3550), in which case the channel encoder (380) can add syntax elements as part of the syntax of the media transmission stream. Or, the channel encoder (380) can organize the aggregated data for storage as a file (e.g., according to a media container format such as ISO/IEC 14496-12), in which case the channel encoder (380) can add syntax elements as part of the syntax of the media storage file. Or, more generally, the channel encoder (380) can implement one or more media system multiplexing protocols or transport protocols, in which case the channel encoder (380) can add syntax elements as part of the syntax of the protocol(s). The channel encoder (380) provides output to a channel (390), which represents storage, a communications connection, or another channel for the output. The channel encoder (380) or channel (390) may also include other elements (not shown), e.g., for forward-error correction ("FEC") encoding and analog signal modulation.

IV. Example Decoder Systems.

FIG. 4 is a block diagram of an example decoder system (400) in conjunction with which some described embodiments may be implemented. The decoder system (400) can be a general-purpose decoding tool capable of operating in any of multiple decoding modes such as a low-latency decoding mode for real-time communication and a higher-latency decoding mode for media playback from a file or stream, or it can be a special-purpose decoding tool adapted for one such decoding mode. The decoder system (400) can be implemented as part of an operating system module, as part of an application library, as part of a standalone application or using special-purpose hardware. Overall, the decoder system (400) receives coded data from a channel (410) and produces reconstructed pictures as output for an output destination (490). The received encoded data can include content encoded using rules enforced for intra-picture prediction modes when WPP is enabled.

The decoder system (400) includes a channel (410), which can represent storage, a communications connection, or another channel for coded data as input. The channel (410) produces coded data that has been channel coded. A channel decoder (420) can process the coded data. For example, the channel decoder (420) de-packetizes and/or demultiplexes data that has been aggregated for transmission or storage as a media stream (e.g., according to a media program stream or transport stream format such as ITU-T H.222.0|ISO/IEC 13818-1 or an internet real-time transport protocol format such as IETF RFC 3550), in which case the channel decoder (420) can parse syntax elements added as part of the syntax of the media transmission stream. Or, the channel decoder (420) separates coded video data that has been aggregated for storage as a file (e.g., according to a media container format such as ISO/IEC 14496-12), in which case the channel decoder (420) can parse syntax elements added as part of the syntax of the media storage file. Or, more generally, the channel decoder (420) can implement one or more media system demultiplexing protocols or transport protocols, in which case the channel decoder (420) can parse syntax elements added as part of the syntax of the protocol(s). The channel (410) or channel decoder (420) may also include other elements (not shown), e.g., for FEC decoding and analog signal demodulation.

The coded data (421) that is output from the channel decoder (420) is stored in a temporary coded data area (430) until a sufficient quantity of such data has been received. The coded data (421) includes coded pictures (431) and MMCO/RPS information (432). The coded data (421) in the coded data area (430) contain, as part of the syntax of an elementary coded video bitstream, coded data for one or more pictures. The coded data (421) in the coded data area (430) can also include media metadata relating to the encoded video data (e.g., as one or more parameters in one or more SEI messages or VUI messages).

In general, the coded data area (430) temporarily stores coded data (421) until such coded data (421) is used by the decoder (450). At that point, coded data for a coded picture (431) and MMCO/RPS information (432) are transferred from the coded data area (430) to the decoder (450). As decoding continues, new coded data is added to the coded data area (430) and the oldest coded data remaining in the coded data area (430) is transferred to the decoder (450).

The decoder (450) decodes a coded picture (431) to produce a corresponding decoded picture (451). A picture can be partitioned into multiple tiles of the same size or different sizes. A picture can also be organized as one or more slices. The content of a slice or tile can be further partitioned into blocks or other sets of sample values. If the picture was encoded with WPP enabled (using WPP, or otherwise in a manner consistent with use of WPP during decoding), rows of certain blocks (e.g., rows of CTUs according to the H.265/HEVC standard) can be decoded in parallel using WPP, as further explained below.

As appropriate, when performing its decoding process, the decoder (450) may use one or more previously decoded pictures (469) as reference pictures for inter-picture prediction. The decoder (450) reads such previously decoded pictures (469) from a decoded picture temporary memory storage area (460). Generally, the decoder (450) includes multiple decoding modules that perform decoding tasks such as entropy decoding, intra-picture prediction, motion-compensated inter-picture prediction, inverse quantization, inverse frequency transforms (if not skipped), and merging of tiles. The exact operations performed by the decoder (450) can vary depending on compression format.

For example, the decoder (450) receives encoded data for a compressed picture or sequence of pictures and produces output including decoded picture (451). In the decoder (450), a buffer receives encoded data for a compressed picture and, at an appropriate time, makes the received encoded data available to an entropy decoder. The entropy decoder entropy decodes entropy-coded quantized data as well as entropy-coded side information, typically applying the inverse of entropy encoding performed in the encoder. When the palette decoding mode is used, the entropy decoder can decode palette data. The decoder (450) can use palette prediction as explained below.

A motion compensator applies motion information to one or more reference pictures to form motion-compensated prediction values for any inter-coded blocks of the picture being reconstructed. An intra-picture prediction module can spatially predict sample values of a current block from neighboring, previously reconstructed sample values. Or, for intra BC prediction, intra LC prediction or intra SC prediction, the intra-picture prediction module can predict sample values of a current block, line or string using previously reconstructed sample values of a reference block, line or string in the picture, which is indicated with a displacement value. Specifically, the reference block/line/string can be indicated with a BV value (for intra BC prediction), offset value (for intra LC prediction), or offset value and string length value (for intra SC prediction). When WPP is enabled, the displacements (e.g., for BV values in intra BC prediction or for offset values in intra SC prediction or intra LC prediction) are consistent with constraints on locations of reference regions, as explained below.

The decoder (450) also reconstructs prediction residual values. An inverse quantizer inverse quantizes entropy-decoded data. For example, the decoder (450) sets values for QP for a picture, tile, slice and/or other portion of video based on syntax elements in the bitstream, and inverse quantizes transform coefficients accordingly. An inverse frequency transformer converts the quantized, frequency-domain data into spatial-domain data. In some implementations, the frequency transform can be skipped, in which case the inverse frequency transform is also skipped. If so, prediction residual values can be entropy decoded and inverse quantized. For an inter-picture predicted block, the decoder (450) combines reconstructed prediction residual values with motion-compensated prediction values. The decoder (450) can similarly combine prediction residual values with prediction values from intra-picture prediction.

For a palette decoding mode, the decoder (450) uses a palette that represents at least some of the sample values of a CU or other unit. The palette maps index values to corresponding colors. During decoding, for positions in the unit, index values from the palette are replaced with the appropriate sample values. An escape coded value in the unit can be decoded using an escape code value and literal values. The palette can change from unit to unit, and information specifying the palettes can be signaled in the bitstream.

An adaptive deblocking filter is included within the motion compensation loop in the video decoder (450) to smooth discontinuities across block boundary rows and/or columns in the decoded picture (451). Other filtering (such as de-ringing filtering, ALF, or SAO filtering; not shown) can alternatively or additionally be applied as in-loop filtering operations.

The decoded picture temporary memory storage area (460) includes multiple picture buffer storage areas (461, 462, . . . , 46n). The decoded picture storage area (460) is an example of a decoded picture buffer. The decoder (450) uses the MMCO/RPS information (432) to identify a picture buffer (461, 462, etc.) in which it can store a decoded picture (451). The decoder (450) stores the decoded picture (451) in that picture buffer.

An output sequencer (480) identifies when the next picture to be produced in output order is available in the decoded picture storage area (460). When the next picture (481) to be produced in output order is available in the decoded picture storage area (460), it is read by the output sequencer (480) and output to the output destination (490) (e.g., display). In general, the order in which pictures are output from the decoded picture storage area (460) by the output sequencer (480) may differ from the order in which the pictures are decoded by the decoder (450).

V. Example Video Encoders.

Figure 5A:
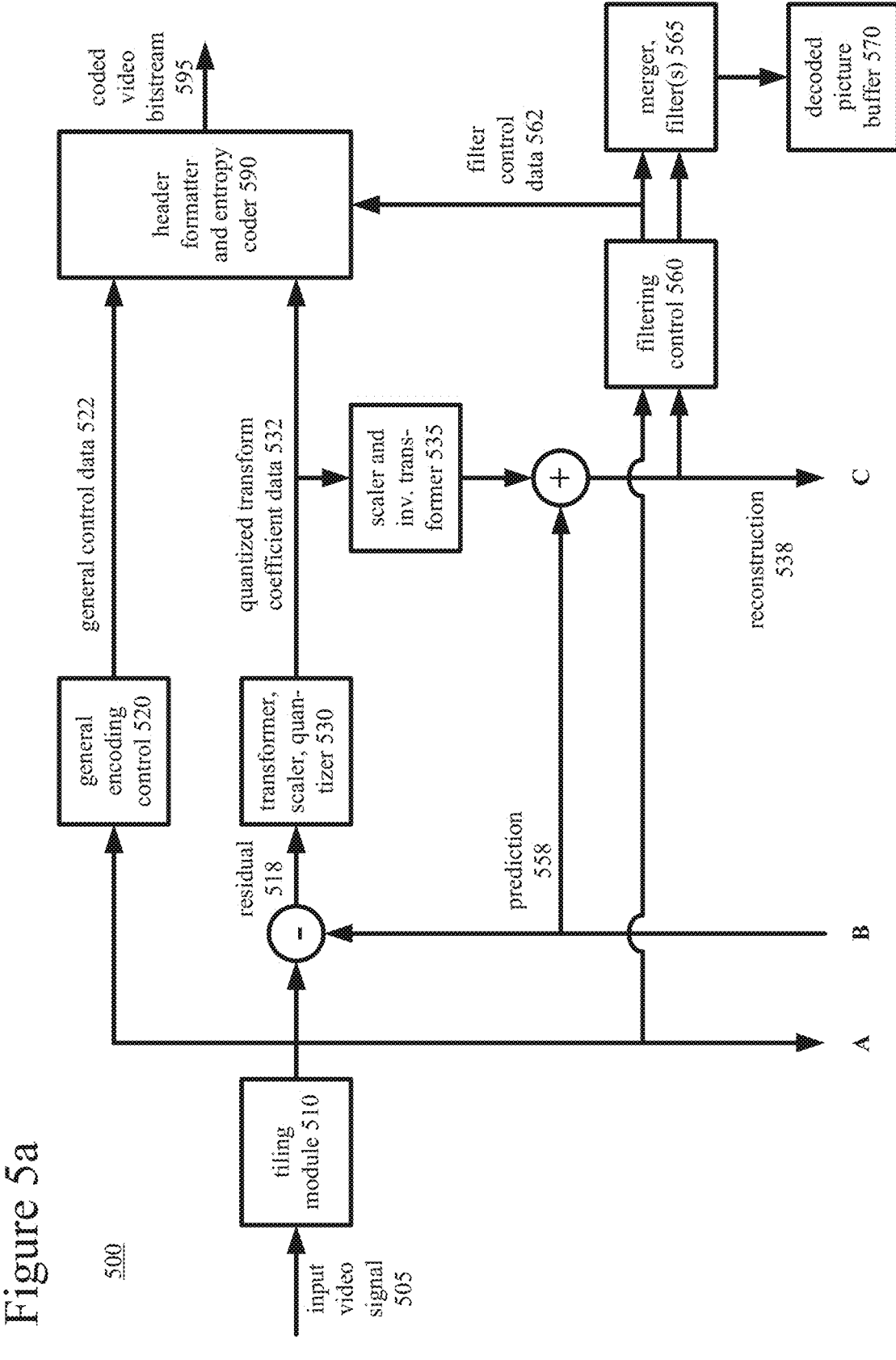
FIGS. 5a and 5b are diagrams illustrating an example video encoder in conjunction with which some described embodiments can be implemented.
Figure 5B:
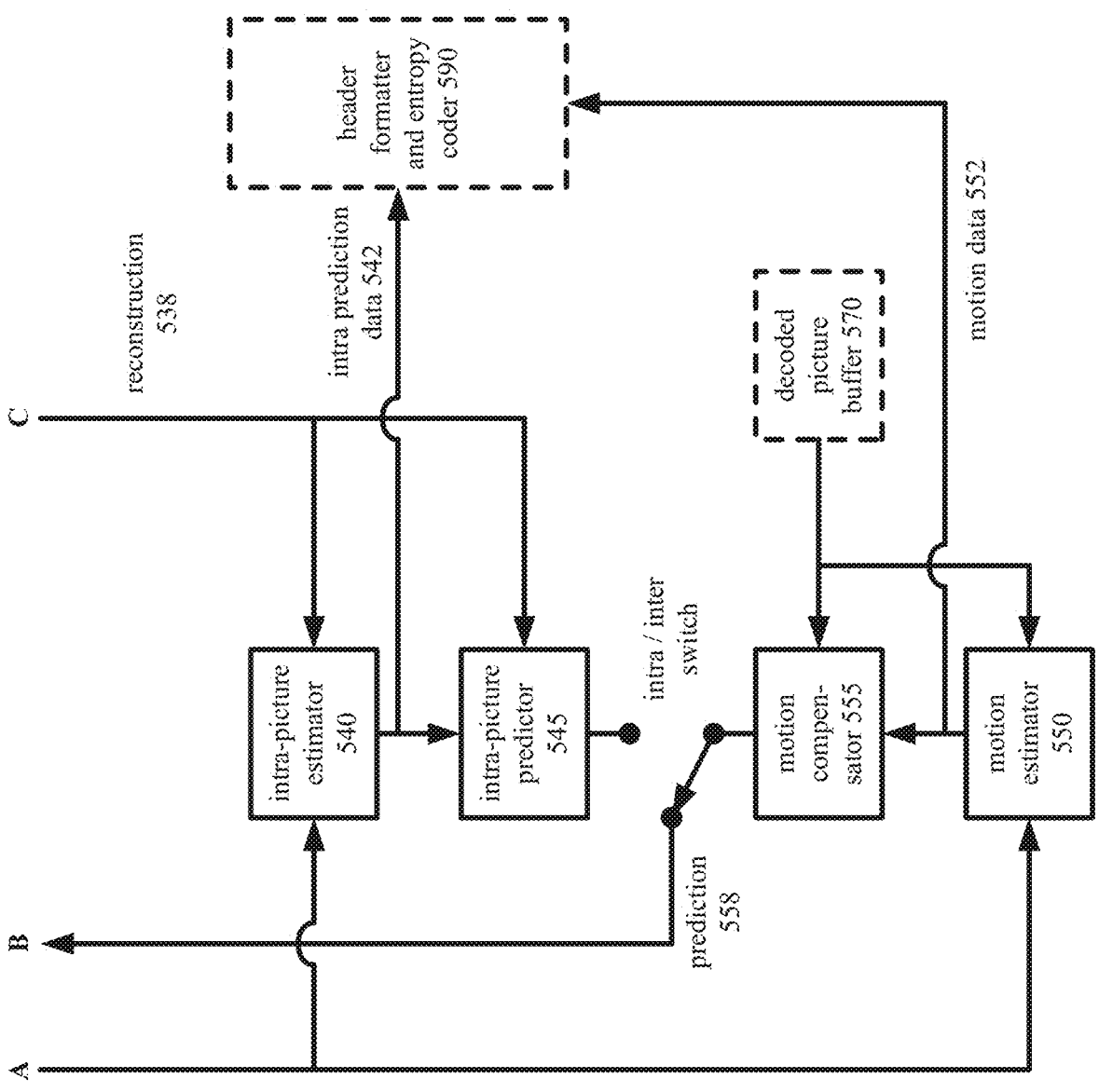

FIGS. 5a and 5b are a block diagram of a generalized video encoder (500) in conjunction with which some described embodiments may be implemented. The encoder (500) receives a sequence of video pictures including a current picture as an input video signal (505) and produces encoded data in a coded video bitstream (595) as output.

The encoder (500) is block-based and uses a block format that depends on implementation. Blocks may be further sub-divided at different stages, e.g., at the prediction, frequency transform and/or entropy encoding stages. For example, a picture can be divided into 64×64 blocks, 32×32 blocks or 16×16 blocks, which can in turn be divided into smaller blocks of sample values for coding and decoding. In implementations of encoding for the H.265/HEVC standard, the encoder partitions a picture into CTUs (CTBs), CUs (CBs), PUs (PBs) and TU (TBs).

The encoder (500) compresses pictures using intra-picture coding and/or inter-picture coding. Many of the components of the encoder (500) are used for both intra-picture coding and inter-picture coding. The exact operations performed by those components can vary depending on the type of information being compressed.

A tiling module (510) optionally partitions a picture into multiple tiles of the same size or different sizes. For example, the tiling module (510) splits the picture along tile rows and tile columns that, with picture boundaries, define horizontal and vertical boundaries of tiles within the picture, where each tile is a rectangular region. In H.265/HEVC implementations, the encoder (500) partitions a picture into one or more slices, where each slice includes one or more slice segments. Rows of certain blocks (e.g., rows of CTUs of a slice according to the H.265/HEVC standard) can be encoded in parallel using WPP, as further explained below.

The general encoding control (520) receives pictures for the input video signal (505) as well as feedback (not shown) from various modules of the encoder (500). Overall, the general encoding control (520) provides control signals (not shown) to other modules (such as the tiling module (510), transformer/scaler/quantizer (530), scaler/inverse transformer (535), intra-picture estimator (540), motion estimator (550) and intra/inter switch) to set and change coding parameters during encoding. In particular, the general encoding control (520) can decide whether and how to use palette prediction, intra BC prediction, intra LC prediction and intra SC prediction during encoding. The general encoding control (520) can also evaluate intermediate results during encoding, for example, performing rate-distortion analysis. The general encoding control (520) produces general control data (522) that indicates decisions made during encoding, so that a corresponding decoder can make consistent decisions. The general control data (522) is provided to the header formatter/entropy coder (590).

If the current picture is predicted using inter-picture prediction, a motion estimator (550) estimates the motion of blocks of sample values of a current picture of the input video signal (505) with respect to one or more reference pictures. The decoded picture buffer (570) buffers one or more reconstructed previously coded pictures for use as reference pictures. When multiple reference pictures are used, the multiple reference pictures can be from different temporal directions or the same temporal direction. The motion estimator (550) produces as side information motion data (552) such as MV data, merge mode index values, and reference picture selection data. The motion data (552) is provided to the header formatter/entropy coder (590) as well as the motion compensator (555).

The motion compensator (555) applies MVs to the reconstructed reference picture(s) from the decoded picture buffer (570). The motion compensator (555) produces motion-compensated predictions for the current picture.

In a separate path within the encoder (500), an intra-picture estimator (540) determines how to perform intra-picture prediction for blocks of sample values of a current picture of the input video signal (505). The current picture can be entirely or partially coded using intra-picture coding. Using values of a reconstruction (538) of the current picture, for intra spatial prediction, the intra-picture estimator (540) determines how to spatially predict sample values of a current block of the current picture from neighboring, previously reconstructed sample values of the current picture.

Or, for intra copy prediction, an intra-picture estimator (540) estimates displacement from a current block, line or string to a position in the other, previously reconstructed sample values. A reference block, line or string of sample values in the picture is used to generate prediction values for the current block, line or string. For example, for intra BC prediction, the intra-picture estimator (540) estimates displacement from a current block to a reference block, which can be indicated with a BV value. As another example, for intra LC prediction, the intra-picture estimator (540) estimates displacement from a current line (of a current block) to a reference line, which can be indicated with an offset value (indicating the displacement from the current line to the reference line). As another example, for intra SC prediction, an intra-picture estimator estimates displacement from a current string (of a current block) to a reference string, which can be indicated with an offset value (indicating the displacement from the current string to the reference string) and a string length value. When WPP is enabled, the intra-picture estimator (540) can determine displacements (e.g., for BV values in intra BC prediction or for offset values in intra SC prediction or intra LC prediction) consistent with constraints on locations of reference regions, as explained below.

Depending on implementation, the intra-picture estimator (540) can perform offset estimation for the current block, line or string using input sample values, reconstructed sample values before in-loop filtering, or reconstructed sample values after in-loop filtering. In general, by using input sample values or unfiltered, reconstructed sample values for offset estimation, the intra-picture estimator (540) can avoid a sequential-processing bottleneck (which may result from filtering reconstructed sample values of a reference block, line, string, etc. before offset estimation/intra copy prediction). On the other hand, storing the unfiltered, reconstructed sample values uses additional memory. Also, if in-loop filtering is applied prior to offset estimation, there may be a region of influence that overlaps between the filtering process that will be applied after the current block/line/string is decoded and the region being used for offset estimation/intra copy prediction. In such a case, the offset estimation/intra copy prediction would be applied before that aspect of the filtering operation. In some implementations, the encoder can apply some in-loop filtering operations before offset estimation/intra copy prediction, and perform additional or alternative filtering in a later processing stage.

The intra-picture estimator (540) produces as side information intra prediction data (542), such as information indicating whether intra prediction uses spatial prediction, intra BC prediction, intra LC prediction or intra SC prediction, prediction mode direction (for intra spatial prediction), BV values (for intra BC prediction), offset values (for intra LC prediction) or offset values and length values (for intra SC prediction). The intra prediction data (542) is provided to the header formatter/entropy coder (590) as well as the intra-picture predictor (545).

According to the intra prediction data (542), the intra-picture predictor (545) spatially predicts sample values of a current block of the current picture from neighboring, previously reconstructed sample values of the current picture. Or, for intra copy prediction, the intra-picture predictor (545) predicts the sample values of a current block, line, string, or other section using previously reconstructed sample values of a reference block, line, string, or other section, which is indicated by a displacement (BV value, offset value, etc.) for the current block, line, string, etc. In some cases, a BV value (or other offset value) can be a predicted value. In other cases, the BV value (or other offset value) can be different than its predicted value, in which case a differential indicates the difference between the predicted value and BV value (or other offset value). For intra SC mode, the intra-picture predictor (545) also uses a string length value when predicting the sample values of the current string.

For a palette coding mode, the encoder (500) represents at least some of the sample values of a CU or other unit using a palette. The palette represents colors used in the unit. For example, the palette maps index values 0, 1, 2, . . . , p to corresponding colors, which can be in RGB 4:4:4 format, BGR 4:4:4 format, GBR 4:4:4 format, YUV 4:4:4 format, or another format (color space, color sampling rate). An index value can represent a RGB triplet, BGR triplet or GBR triplet for a pixel, where a pixel is a set of co-located sample values. For encoding of the unit, index values replace the sample values of pixels in the unit. A rare value in the unit can be encoded using an escape code value and literal values, instead of using an index value in the palette. The palette can change from unit to unit, and palette data specifying the palettes can be signaled in the bitstream.

The intra/inter switch selects whether the prediction (558) for a given block will be a motion-compensated prediction or intra-picture prediction.

In some example implementations, no residual is calculated for a unit encoded in palette coding mode or an intra copy mode (intra BC prediction, intra LC prediction or intra SC prediction). Instead, residual coding is skipped, and the predicted sample values are used as the reconstructed sample values.

When residual coding is not skipped, the difference (if any) between a block of the prediction (558) and a corresponding part of the original current picture of the input video signal (505) provides values of the residual (518). During reconstruction of the current picture, when residual values have been encoded/signaled, reconstructed residual values are combined with the prediction (558) to produce an approximate or exact reconstruction (538) of the original content from the video signal (505). (In lossy compression, some information is lost from the video signal (505).)

As part of residual coding, in the transformer/scaler/quantizer (530), when a frequency transform is not skipped, a frequency transformer converts spatial-domain video information into frequency-domain (i.e., spectral, transform) data. For block-based video coding, the frequency transformer applies a discrete cosine transform ("DCT"), an integer approximation thereof, or another type of forward block transform (e.g., a discrete sine transform or an integer approximation thereof) to blocks of prediction residual data (or sample value data if the prediction (558) is null), producing blocks of frequency transform coefficients. The transformer/scaler/quantizer (530) can apply a transform with variable block sizes. In this case, the transformer/scaler/quantizer (530) can determine which block sizes of transforms to use for the residual values for a current block. The scaler/quantizer scales and quantizes the transform coefficients. For example, the quantizer applies dead-zone scalar quantization to the frequency-domain data with a quantization step size that varies on a picture-by-picture basis, tile-by-tile basis, slice-by-slice basis, block-by-block basis, frequency-specific basis or other basis. The quantized transform coefficient data (532) is provided to the header formatter/entropy coder (590). If the frequency transform is skipped, the scaler/quantizer can scale and quantize the blocks of prediction residual data (or sample value data if the prediction (558) is null), producing quantized values that are provided to the header formatter/entropy coder (590).

To reconstruct residual values, in the scaler/inverse transformer (535), a scaler/inverse quantizer performs inverse scaling and inverse quantization on the quantized transform coefficients. When the transform stage has not been skipped, an inverse frequency transformer performs an inverse frequency transform, producing blocks of reconstructed prediction residual values or sample values. If the transform stage has been skipped, the inverse frequency transform is also skipped. In this case, the scaler/inverse quantizer can perform inverse scaling and inverse quantization on blocks of prediction residual data (or sample value data), producing reconstructed values. When residual values have been encoded/signaled, the encoder (500) combines reconstructed residual values with values of the prediction (558) (e.g., motion-compensated prediction values, intra-picture prediction values) to form the reconstruction (538). When residual values have not been encoded/signaled, the encoder (500) uses the values of the prediction (558) as the reconstruction (538).

For intra-picture prediction, the values of the reconstruction (538) can be fed back to the intra-picture estimator (540) and intra-picture predictor (545). The values of the reconstruction (538) can be used for motion-compensated prediction of subsequent pictures. The values of the reconstruction (538) can be further filtered. A filtering control (560) determines how to perform deblock filtering and SAO filtering on values of the reconstruction (538), for a given picture of the video signal (505). The filtering control (560) produces filter control data (562), which is provided to the header formatter/entropy coder (590) and merger/filter(s) (565).

In the merger/filter(s) (565), the encoder (500) merges content from different tiles into a reconstructed version of the picture. The encoder (500) selectively performs deblock filtering and SAO filtering according to the filter control data (562) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the encoder (500), and the encoder (500) may provide syntax elements within the coded bitstream to indicate whether or not such filtering was applied. The decoded picture buffer (570) buffers the reconstructed current picture for use in subsequent motion-compensated prediction.

The header formatter/entropy coder (590) formats and/or entropy codes the general control data (522), quantized transform coefficient data (532), intra prediction data (542), motion data (552) and filter control data (562). For the motion data (552), the header formatter/entropy coder (590) can select and entropy code merge mode index values, or a default MV predictor can be used. In some cases, the header formatter/entropy coder (590) also determines MV differentials for MV values (relative to MV predictors for the MV values), then entropy codes the MV differentials, e.g., using context-adaptive binary arithmetic coding. For the intra prediction data (542), a BV value (or other offset value) can be encoded using prediction. The prediction can use a default predictor (e.g., a BV value or other offset value from one or more neighboring blocks). When multiple predictors are possible, a predictor index can indicate which of the multiple predictors to use for prediction of the BV value (or other offset value). The header formatter/entropy coder (590) can select and entropy code predictor index values (for intra copy prediction), or a default predictor can be used. In some cases, the header formatter/entropy coder (590) also determines differentials (relative to predictors for the BV values or other offset values), then entropy codes the differentials, e.g., using context-adaptive binary arithmetic coding. For palette coding mode, the header formatter/entropy coder (590) can encode palette data. In particular, the header formatter/entropy coder (590) can use palette prediction as explained below.

The header formatter/entropy coder (590) provides the encoded data in the coded video bitstream (595). The format of the coded video bitstream (595) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

Depending on implementation and the type of compression desired, modules of an encoder (500) can be added, omitted, split into multiple modules, combined with other modules, and/or replaced with like modules. In alternative embodiments, encoders with different modules and/or other configurations of modules perform one or more of the described techniques. Specific embodiments of encoders typically use a variation or supplemented version of the encoder (500). The relationships shown between modules within the encoder (500) indicate general flows of information in the encoder; other relationships are not shown for the sake of simplicity.

VI. Example Video Decoders.

FIG. 6 is a block diagram of a generalized decoder (600) in conjunction with which some described embodiments may be implemented. The decoder (600) receives encoded data in a coded video bitstream (605) and produces output including pictures for reconstructed video (695). The format of the coded video bitstream (605) can be a variation or extension of H.265/HEVC format, Windows Media Video format, VC-1 format, MPEG-x format (e.g., MPEG-1, MPEG-2, or MPEG-4), H.26x format (e.g., H.261, H.262, H.263, H.264), or another format.

A picture can be organized as multiple tiles of the same size or different sizes. A picture can also be organized as one or more slices. The content of a slice or tile can be further organized as blocks or other sets of sample values. The decoder (600) is block-based and uses a block format that depends on implementation. Blocks may be further subdivided at different stages. For example, a picture can be divided into 64×64 blocks, 32×32 blocks or 16×16 blocks, which can in turn be divided into smaller blocks of sample values. In implementations of decoding for the H.265/HEVC standard, a picture is partitioned into CTUs (CTBs), CUs (CBs), PUs (PBs) and TU (TBs). If the picture was encoded with WPP enabled (using WPP, or in a manner consistent with use of WPP during decoding), rows of certain blocks (e.g., rows of CTUs according to the H.265/HEVC standard) can be decoded in parallel using WPP, as further explained below.

The decoder (600) decompresses pictures using intra-picture decoding and/or inter-picture decoding. Many of the components of the decoder (600) are used for both intra-picture decoding and inter-picture decoding. The exact operations performed by those components can vary depending on the type of information being decompressed.

A buffer receives encoded data in the coded video bitstream (605) and makes the received encoded data available to the parser/entropy decoder (610). The parser/entropy decoder (610) entropy decodes entropy-coded data, typically applying the inverse of entropy coding performed in the encoder (500) (e.g., context-adaptive binary arithmetic decoding). As a result of parsing and entropy decoding, the parser/entropy decoder (610) produces general control data (622), quantized transform coefficient data (632), intra prediction data (642), motion data (652) and filter control data (662). For the intra prediction data (642), if predictor index values are signaled, the parser/entropy decoder (610) can entropy decode the predictor index values, e.g., using context-adaptive binary arithmetic decoding. In some cases, the parser/entropy decoder (610) also entropy decodes differentials for BV values or other offset values (e.g., using context-adaptive binary arithmetic decoding), then combines the differentials with corresponding predictors to reconstruct the BV values (or other offset values). In other cases, the differential is omitted from the bitstream, and the BV value (or other offset value) is simply the predictor (e.g., indicated with the predictor index value). For palette decoding mode, the parser/entropy decoder (610) can decode palette data. In particular, the parser/entropy decoder (610) can use palette prediction as explained below.

The general decoding control (620) receives the general control data (622) and provides control signals (not shown) to other modules (such as the scaler/inverse transformer (635), intra-picture predictor (645), motion compensator (655) and intra/inter switch) to set and change decoding parameters during decoding.

If the current picture is predicted using inter-picture prediction, a motion compensator (655) receives the motion data (652), such as MV data, reference picture selection data and merge mode index values. The motion compensator (655) applies MVs to the reconstructed reference picture(s) from the decoded picture buffer (670). The motion compensator (655) produces motion-compensated predictions for inter-coded blocks of the current picture. The decoded picture buffer (670) stores one or more previously reconstructed pictures for use as reference pictures.

In a separate path within the decoder (600), the intra-picture predictor (645) receives the intra prediction data (642), such as information indicating whether intra-picture prediction uses spatial prediction, intra BC prediction, intra LC prediction or intra SC prediction, as well as prediction mode direction (for intra spatial prediction), BV values (for intra BC prediction), offset values (for intra LC prediction), or offset values and length values (for intra SC prediction). For intra spatial prediction, using values of a reconstruction (638) of the current picture, according to prediction mode data, the intra-picture predictor (645) spatially predicts sample values of a current block of the current picture from neighboring, previously reconstructed sample values of the current picture. Or, for intra copy prediction, the intra-picture predictor (645) predicts the sample values of a current block, line, string, or other section using previously reconstructed sample values of a reference block, line, string, or other section, which is indicated by a displacement (BV value, offset value, etc.) for the current block, line, string, etc. In some cases, a BV value (or other offset value) can be a predicted value. In other cases, the BV value (or other offset value) can be different than its predicted value, in which case the BV value (or other offset value) is reconstructed using a differential and the predicted value. For intra SC mode, the intra-picture predictor (645) also uses a string length value when predicting the sample values of the current string.

For a palette decoding mode, the decoder (600) uses a palette that represents at least some of the sample values of a CU or other unit. The palette maps index values to corresponding colors used in the unit. For example, the palette maps index values 0, 1, 2, . . . , p to corresponding colors, which can be in RGB 4:4:4 format, BGR 4:4:4 format, GBR 4:4:4 format, YUV 4:4:4 format, or another format (color space, color sampling rate). An index value can represent a RGB triplet, BGR triplet or GBR triplet for a pixel. During decoding, for positions in the unit, index values from the palette are replaced with the appropriate sample values. An escape coded value in the unit can be decoded using an escape code value and literal values. The palette can change from unit to unit, based on palette data signaled in the bitstream.

The intra/inter switch selects values of a motion-compensated prediction or intra-picture prediction for use as the prediction (658) for a given block. For example, when H.265/HEVC syntax is followed, the intra/inter switch can be controlled based on a syntax element encoded for a CU of a picture that can contain intra-predicted CUs and inter-predicted CUs. When residual values have been encoded/signaled, the decoder (600) combines the prediction (658) with reconstructed residual values to produce the reconstruction (638) of the content from the video signal. When residual values have not been encoded/signaled, the decoder (600) uses the values of the prediction (658) as the reconstruction (638).

To reconstruct the residual when residual values have been encoded/signaled, the scaler/inverse transformer (635) receives and processes the quantized transform coefficient data (632). In the scaler/inverse transformer (635), a scaler/inverse quantizer performs inverse scaling and inverse quantization on the quantized transform coefficients. An inverse frequency transformer performs an inverse frequency transform, producing blocks of reconstructed prediction residual values or sample values. For example, the inverse frequency transformer applies an inverse block transform to frequency transform coefficients, producing sample value data or prediction residual data. The inverse frequency transform can be an inverse DCT, an integer approximation thereof, or another type of inverse frequency transform (e.g., an inverse discrete sine transform or an integer approximation thereof). If the frequency transform was skipped during encoding, the inverse frequency transform is also skipped. In this case, the scaler/inverse quantizer can perform inverse scaling and inverse quantization on blocks of prediction residual data (or sample value data), producing reconstructed values.

For intra-picture prediction, the values of the reconstruction (638) can be fed back to the intra-picture predictor (645). For inter-picture prediction, the values of the reconstruction (638) can be further filtered. In the merger/filter(s) (665), the decoder (600) merges content from different tiles into a reconstructed version of the picture. The decoder (600) selectively performs deblock filtering and SAO filtering according to the filter control data (662) and rules for filter adaptation, so as to adaptively smooth discontinuities across boundaries in the pictures. Other filtering (such as de-ringing filtering or ALF; not shown) can alternatively or additionally be applied. Tile boundaries can be selectively filtered or not filtered at all, depending on settings of the decoder (600) or a syntax element within the encoded bitstream data. The decoded picture buffer (670) buffers the reconstructed current picture for use in subsequent motion-compensated prediction.

The decoder (600) can also include a post-processing filter. The post-processing filter (608) can include deblock filtering, de-ringing filtering, adaptive Wiener filtering, film-grain reproduction filtering, SAO filtering or another kind of filtering. Whereas "in-loop" filtering is performed on reconstructed sample values of pictures in a motion compensation loop, and hence affects sample values of reference pictures, the post-processing filter (608) is applied to reconstructed sample values outside of the motion compensation loop, before output for display.

Depending on implementation and the type of decompression desired, modules of the decoder (600) can be added, omitted, split into multiple modules, combined with other modules, and/or replaced with like modules. In alternative embodiments, decoders with different modules and/or other configurations of modules perform one or more of the described techniques. Specific embodiments of decoders typically use a variation or supplemented version of the decoder (600). The relationships shown between modules within the decoder (600) indicate general flows of information in the decoder; other relationships are not shown for the sake of simplicity.

VII. Rules for Intra-Picture Prediction Modes When WPP is Enabled.

This section presents examples of rules for intra-picture prediction modes when wavefront parallel processing ("WPP") is enabled. The innovations facilitate the use of intra-picture prediction modes such as palette prediction mode, intra block copy ("BC") mode, intra line copy ("LC") mode and intra string copy ("SC") mode by an encoder or decoder when WPP is enabled.

A. Wavefront Parallel Processing-Introduction

In general, WPP is a coding/decoding tool that facilitates parallel processing by differentially delaying the start of processing for rows of units in a picture. When WPP is enabled, different rows of units in a picture can be encoded or decoded in parallel. During encoding or decoding, a first row of units can be processed unit-after-unit, from left to right. Processing (encoding or decoding) of a second row of units need not wait for completion of processing for the entire first row of units. Instead, processing of the second row of units can begin after processing completes for several of the first row's units, which provide information used when processing the initial unit of the second row. Similarly, processing of a third row of units can begin after processing completes for several of the second row's units. Thus, WPP facilitates parallel processing of different rows of units-different threads or processing cores can perform the processing for different rows of units on a staggered, time-delayed basis.

For example, according to the H.265/HEVC standard, when WPP is enabled, a slice is divided into rows of CTUs. During encoding or decoding, the first row of CTUs can be processed CTU-after-CTU. Processing of the second row of CTUs can begin after processing completes for the first two CTUs of the first row, which provide information (e.g., reconstructed sample values, reconstructed MV values or BV values, context model information) used when processing the initial CTU of the second row. Similarly, processing of the third row of CTUS can begin after processing completes for the first two CTUs of the second row.

FIG. 7 illustrates the timing (700) of WPP for a current picture (710) according to the H.265/HEVC standard. The picture (710) is partitioned into CTUs, which are organized in CTU columns and CTU rows. Different CTU rows can be encoded or decoded in parallel using WPP. The timing of WPP reflects dependencies between CTUs during encoding or decoding. In this example, a given CTU may depend on information (such as reconstructed sample values, reconstructed MV values or BV values, context model information) from (1) the neighboring CTU(s) to its left, (2) the neighboring CTU(s) to its above and left, (3) the neighboring CTU(s) above the given CTU, and (4) the neighboring CTU(s) above and to the right of the given CTU, where such neighboring CTUs (1)-(4) are available (e.g., are within the picture, in the same slice and tile). Each neighboring CTU, in turn, may depend on its neighboring CTUs (1)-(4), if available. FIG. 8 illustrates cascading dependencies for the initial CTU of a fifth CTU row. The initial CTU of the fifth CTU row depends on the first two CTUs of the fourth CTU row, which collectively depend on the first three CTUs of the third CTU row, and so on.

With reference to FIG. 7, for WPP, the first CTU row (that is, CTU row 0) is processed CTU-after-CTU for wave 0. For wave 1, processing of the initial CTU in CTU row 1 can begin after encoding/decoding of the second CTU in CTU row 0 finishes. Similarly, for wave 2, processing of the initial CTU in CTU row 2 can begin after encoding/decoding of the second CTU in CTU row 1 finishes. For wave 3, processing of the initial CTU in CTU row 3 can begin after encoding/decoding of the second CTU in CTU row 2 finishes, and for wave 4, processing of the initial CTU in CTU row 4 begins after encoding/decoding of the second CTU in CTU row 3 finishes.

Even when the CTU rows are processed in parallel, this staggered, time-delayed processing ensures that dependencies between CTUs are satisfied when processing starts for a CTU row. In FIG. 7, the two-CTU lead for each CTU row is maintained during processing. For each CTU row, processing for the current CTU (shown in bold outline) is two CTUs ahead of processing for the current CTU in the next CTU row. In practice, however, processing for a given CTU row may stall or slow down, causing cascading delays in processing for later CTU rows that depend on completion (directly or indirectly) of processing for a CTU in the given CTU row. For a given CTU of a later CTU row, dependencies cascade from previous CTU rows. In the example (800) shown in FIG. 8, for the initial CTU of the fifth CTU row of the frame (810), the first two CTUs of the fourth CTU row have been processed. Otherwise, processing for the initial CTU of the fifth CTU row could not start. By extension, the third CTU of the third CTU row has been processed, because otherwise processing for the second CTU of the fourth CTU row could not have started. Similarly, the fourth CTU of the second CTU row has been processed, as a pre-condition for processing for the third CTU of the third CTU row. Finally, the fifth CTU of the first CTU row has been processed, as a pre-condition for processing for the fourth CTU of the second CTU row. FIG. 8 thus shows reconstructed content guaranteed to be available for prediction of the initial CTU in wave 4 (the fifth CTU row) when WPP is enabled.

In contrast, when WPP is not enabled, CTUs are processed from left to right in a CTU row, CTU row after CTU row from top to bottom of a picture (or slice and tile, if used). The context model information (also called CABAC status information or entropy coding information) used for a given CTU may account for results of processing any previous CTUs in the same CTU row and any previous CTU rows of the picture (or slice/tile), which are earlier CTUs in coding/decoding order. For example, processing of the second CTU in a CTU row depends on results of processing of the first CTU in the CTU row, and so on. As another example, processing for the initial CTU in a CTU row depends on results of processing for the last CTU in the previous CTU row in the picture (or slice/tile).

On the other hand, when WPP is enabled, processing for the initial CTU in a CTU row does not depend on results of processing for the last CTU in the previous CTU row in the picture (or slice/tile). The processing for the initial CTU in a CTU row can start after processing finishes for the second CTU in the previous CTU row in the picture (or slice/tile), even though context model information from the last CTU in the previous CTU row is unavailable. Processing of the third CTU in the previous CTU row still depends on results of processing of the second CTU in that CTU row, just like when WPP is not enabled.

When WPP is enabled, an encoder may or may not actually use WPP during encoding. Regardless, the encoder enforces constraints and prediction rules that apply when WPP is actually used. Similarly, when WPP is enabled, a decoder may or may not actually use WPP during decoding.

A syntax element in a bitstream can indicate whether WPP is enabled for a video sequence, set of pictures or picture. For example, the syntax element can be signaled in a SPS, PPS or other syntax structure in the bitstream. In H.265/HEVC implementations, for example, the value of the syntax element entropy_coding_sync_enabled_flag, which is signaled in a PPS syntax structure, indicates whether WPP is enabled for the picture(s) associated with the PPS syntax structure. If entropy_coding_sync_enabled_flag equals 1, WPP is enabled for the picture(s). Otherwise, WPP is not enabled for the picture(s).

B. Palette Coding/Decoding Modes and Palette Prediction-Introduction

In general, a palette coding/decoding mode uses a palette to represent at least some of the sample values of a unit (e.g., a CU in H.265/HEVC implementations or other unit). For example, the palette maps index values 0, 1, 2, . . . , p to corresponding colors, which can be in RGB 4:4:4 format, BGR 4:4:4 format, GBR 4:4:4 format, YUV 4:4:4 format, or another format (color space, color sampling rate). An index value can represent a RGB triplet, BGR triplet or GBR triplet for a pixel. FIG. 9 shows two examples of palettes. The palette for a current unit (that is, the "current palette") includes p index values 0, . . . , p–1, which are associated with RGB triplets. The palette for a previous unit (represented in the "previous palette data") includes q index values 0, . . . , q–1, which are associated with RGB triplets. The values of p and q can be the same or different. During encoding, an encoder can replace the sample values of a pixel using an index value, which may be further encoded, e.g., using entropy coding. During decoding, a decoder can restore the sample values of the pixel from the index value using the palette, e.g., after entropy decoding of the index value.

In particular, palette coding/decoding mode can be effective when a unit includes relatively few distinct colors, which is a common characteristic for screen content video. For example, a 64×64 CU in RGB 4:4:4 format includes 64×64-4096 pixels but may include far fewer colors (e.g., 1 to 20 colors). A rare color in a unit can be encoded using an escape code value and literal values (for the respective sample values), instead of including the rare color directly in the palette.

Two units can use the same palette, but colors typically change from unit to unit within a picture. As such, palettes typically change from unit to unit within the picture. For palettes, an encoder signals palette data, which may be entropy coded, in a bitstream. A decoder receives and parses the palette data, entropy decodes it as appropriate, and reconstructs the palettes. The encoder and decoder can use palette prediction to reduce the bit rate associated with signaling palette data.

In general, palette prediction can be any approach used during encoding or decoding to predict the values of the palette for a current unit (current palette) using palette data from one or more palettes for previous units (previous palette data). Although colors typically change from unit to unit within a picture, in many cases at least some of the colors in a given unit are also used in an adjacent unit. Palette prediction exploits that observation to reduce the bit rate for palette data.

FIG. 9 shows a simplified example (900) of palette prediction in which the palette for a current unit (current palette) is predicted using the palette for a previous unit (represented in the previous palette data). For example, the previous palette data can be from the palette used by the previous unit encoded or decoded before the current unit, if the previous unit used palette coding/decoding mode. If the previous unit did not use palette coding/decoding mode, the previous palette data for the current unit can be "inherited" from the previous unit. That is, the previous palette data that was available to the previous unit can be reused as the previous palette data available to the current unit. (In some example implementations, previous palette data is, in effect, status or state information for the current unit. A given unit that does not itself use palette coding/decoding mode still has previous palette data, which may be inherited by the next unit.) Thus, through a chain of inheritance, the previous palette data for the current unit can include palette data from the palette of the most recent, previously processed unit (if any) that used palette coding/decoding mode.

For palette prediction, the encoder can determine whether the current palette is the same as the previous palette data. If so, the encoder can simply indicate the previous palette data is to be reused as the current palette. Otherwise (current palette is different than the previous palette data), the encoder determines changes between the previous palette data and the current palette, and signals syntax elements that indicate the changes. For example, as shown in FIG. 9, for a given index value of the current palette, the encoder signals whether the corresponding color for the given index value is a color in the previous palette data ("prev") or a new color ("new"). If the corresponding color is a color in the previous palette data, the encoder signals the index value (from the previous palette data) for the color in the previous palette data, which can be used to populate the current palette. In FIG. 9, the color for index value 1 of the previous palette data is re-assigned to index value 0 in the current palette, and the color for index value 0 of the previous palette data is re-assigned to index value 2 in the current palette. Thus, colors can change positions from palette to palette, e.g., so that the most common colors have the lowest index values, which may improve the efficiency of entropy coding. If the corresponding color for a given index value is a new color, the encoder signals the triplet for the new color. In FIG. 9, for example, for index value 1 in the current palette, the encoder signals a new triplet (215, 170, 200), which is used to update the current palette.

Based on the syntax elements signaled by the encoder, the decoder can determine whether the current palette is the same as the previous palette data, which is available at the decoder. If so, the decoder can reuse the previous palette data as the current palette. Otherwise (current palette is different than the previous palette data), the decoder receives and parses syntax elements that indicate the changes between the previous palette data and the current palette. For example, as shown in FIG. 9, for a given index value of the current palette, the decoder determines whether the corresponding color for the given index value is a color in the previous palette data ("prev") or a new color ("new"). If the corresponding color is a color in the previous palette data, the decoder receives and parses a syntax element that indicates the index value (from the previous palette data) for the color in the previous palette data, which can be used to populate the current palette. If the corresponding color for a given index value is a new color, the decoder receives and parses syntax elements that indicate the new color.

After constructing the current palette, the encoder and decoder update the previous palette data for the next unit to store palette data from the current palette. This new "previous palette data" can be used to predict the palette for the next unit.

FIG. 9 shows a simplified example (900). In practice, the syntax elements and rules used to signal palette data can be more complicated. For additional details about palette coding/decoding and palette prediction in example implementations, see, e.g., sections 7.3.8.8, 7.4.9.6 and 8.4.1 of JCTVC-R1005. Alternatively, another approach is used to signal palette data.

C. Palette Prediction when WPP is Enabled

In general, previous palette data for purposes of palette prediction is used to predict the palette of a current unit (current palette). For example, the previous palette data can be actual palette data from the neighbor unit encoded or decoded before the current unit (if the neighbor unit used palette coding/decoding mode). Or (if the neighbor unit did not use palette coding/decoding mode), the previous palette data available to the neighbor unit can be reused (or "inherited") as the previous palette data for the current unit.

In some example implementations, when WPP is not enabled, for the initial unit in the current row, the previous palette data is from the last unit in the previous row (e.g., from the palette of the last unit if the last unit used palette coding/decoding mode; otherwise, the previous palette data available to the last unit). When WPP is enabled, for the initial unit in the current row, previous palette data from the last unit in the previous row might not be available. Resetting palette prediction at the start of each row of units (no predictor for palette prediction for the initial unit in the current unit), however, can have a negative impact on coding efficiency.

Instead, when WPP is enabled, the encoder or decoder can use previous palette data from one of the first two units in the previous row (e.g., one of the first two CUs in the first two CTUs of the previous row), which have already been processed in order for processing of the initial unit in the current row to start. For example, for the initial unit in the current row, the previous palette data for purposes of palette prediction is from the second unit of the previous row (actual palette data of the second unit if the second unit used palette coding/decoding mode, or the previous palette data available to the second unit of the previous row otherwise). Thus, for the initial unit in the current row, if the second unit did not use palette coding/decoding mode, the previous palette data is potentially palette data from the first unit in the previous row (if the first unit used palette coding/decoding mode) or (if neither of the first two units in the previous row used palette coding/decoding mode) the previous palette data from the first unit of the previous row, which may depend on a palette for the second unit of the row before the previous row, and so on. (Alternatively, if neither of the first two units in the previous row used palette coding/decoding mode, the previous palette data can be null—no predictor—or use a default predictor.) After the initial unit in the current row, for a current unit, the previous palette data for purposes of palette prediction is palette data from the neighbor unit encoded or decoded before the current unit (if the neighbor unit used palette coding/decoding mode) or (if the neighbor unit did not use palette coding/decoding mode) the previous palette data available to the neighbor unit, just like when WPP is not enabled.

FIG. 10 shows palette prediction dependencies (1000) for a current picture (1010) processed with WPP enabled according to some example implementations. The picture (1010) is organized by CTU rows and CTU columns. In the example of FIG. 10, each CTU includes a single CU. More generally, a given CTU can be recursively split into multiple CUs (e.g., a single CU can be split into four CUs, each of which may be further split into smaller CUs). The state of processing (e.g., the current CTUs being encoded or decoded) generally corresponds to the state of processing shown in FIG. 7. The arrows in FIG. 10 show the direction of palette prediction when WPP is enabled. For the initial CU in the first CTU row, there is no predictor. Alternatively, a default predictor can be used. For each later CU in the first CTU row, the previous palette data is from the CU to the left. For the initial CU in any CTU row after the first CTU row, the previous palette data is from the second CU of the previous row. For each later CU in any CTU row after the first CTU row, the previous palette data is from the previous CU in the same row. For any CU that uses palette coding/decoding mode, its palette is used to construct the previous palette data for prediction of the palette of the next CU. If a given CU does not use palette coding/decoding mode, the previous palette data that was available to the given CU is retained as the previous palette data of the next CU.

When a CTU includes multiple CUs, for purposes of palette prediction for a current CU, the previous CU can be the earlier CU in z-scan order. The earlier CU can be in the same CTU or a different CTU (for the first CU of the CTU). Section VII.D explains, with reference to FIG. 17, examples of z-scan order in some example implementations.

The encoder and decoder can use memory to store previous palette data used for palette prediction. The amount of palette data that is saved for the previous palette data depends on implementation. In general, the previous palette data can include a count C of colors in the previous palette data and details of sample values (e.g., color triplets in RGB 4:4:4 format, GBR 4:4:4 format, BGR 4:4:4 format, YUV 4:4:4 format, or another format) for the colors. The encoder and decoder can save all palette data for a previous palette. Saving all palette data for the previous palette, however, can consume a significant amount of memory for a large palette. Alternatively, to reduce memory consumption in some cases, the encoder and decoder limit C by a threshold count, where the threshold count depends on implementation. In this case, the encoder and decoder save previous palette data for the first C different colors in the previous palette, where C is limited by a threshold count. For example, the threshold count is 16 or 32. Or, when WPP is enabled, for palette prediction for the initial unit of a current row, the encoder and decoder save previous palette data for, at most, the first C1 different colors. After that, the encoder and decoder save previous palette data for, at most, the first C2 different colors for palette prediction within a current row. For example, C1 is 16 or 32, and C2 is 64.

FIG. 11 shows a generalized technique (1100) for encoding that includes palette prediction, when WPP is enabled. An encoder such as the encoder shown in FIG. 3 or FIGS. 5a and 5b, or other encoder, can perform the technique (1100). FIG. 12 shows a generalized technique (1200) for decoding that includes palette prediction, when WPP is enabled. A decoder such as the decoder shown in FIG. 4 or FIG. 6, or other decoder, can perform the technique (1200).

With reference to FIG. 11, an encoder encodes (1110) a picture with WPP enabled. The encoding (1110) produces encoded data. As part of the encoding (1110), for a palette coding mode, the encoder predicts a palette for an initial unit in a current WPP row of the picture using previous palette data from a previous unit in a previous WPP row of the picture. The encoder outputs (1120) the encoded data as part of a bitstream.

With reference to FIG. 12, a decoder receives (1210) encoded data as part of a bitstream. The decoder decodes (1220) the encoded data with WPP enabled. The decoding (1220) reconstructs a picture. As part of the decoding (1220), for a palette decoding mode, the decoder predicts a palette for an initial unit in a current WPP row of the picture using previous palette data from a previous unit in a previous WPP row of the picture.

In some example implementations, at the encoder or decoder, the current WPP row and the previous WPP row are rows of CTUs, and the initial unit and previous unit are CUs. Alternatively, WPP rows are rows of another type of unit and/or the initial and previous units are another type of unit. A syntax element in the bitstream can indicate whether WPP is enabled for a video sequence, set of pictures or picture. The syntax element can be signaled in a SPS syntax structure, PPS syntax structure (e.g., the syntax element entropy_coding_sync_enabled_flag in H.265/HEVC implementations) or other syntax structure in the bitstream.

In general, during encoding or decoding, the palette for the initial unit in the current WPP row represents at least some colors used in the initial unit in the current WPP row. The previous palette data from the previous unit in the previous WPP row may represent at least some colors used in a palette for the previous unit in the previous WPP row (if the previous unit used palette coding/decoding mode). Or (if the previous unit did not use palette coding/decoding mode), the previous palette data from the previous unit in the previous WPP row may have been inherited by the previous unit from an earlier unit, which may have used palette coding/decoding mode or itself inherited the previous palette data. Colors not represented in a palette can be escape coded. The previous WPP row can be the WPP row immediately above the current WPP row. The previous unit in the previous WPP row can be above the initial unit in the current WPP row (e.g., the first unit in the previous row in FIG. 10), or it can be above and to the right of the initial unit in the current WPP row (e.g., the second unit in the previous row in FIG. 10). After processing of the initial unit in the current WPP row, for the palette of a subsequent unit in the current WPP row of the picture, the encoder or decoder can predict the palette (of the subsequent unit) using palette data from the palette for the initial unit in the current WPP row.

During encoding or decoding, palette prediction can include several stages. For example, during encoding, the encoder can determine (based on a comparison of the current palette to the previous palette data) whether to reuse the previous palette data from the previous unit in the previous WPP row as the palette for the initial unit in the current WPP row (current palette). During decoding, the decoder can determine (based on information signaled by the encoder) whether to reuse the previous palette data from the previous unit in the previous WPP row as the palette for the initial unit in the current WPP row (current palette). As another example, during encoding, when there are changes to the palette, the encoder can select one or more colors from the previous palette data from the previous unit in the previous WPP row to include in the palette for the initial unit in the current WPP row (current palette). The encoder signals syntax elements indicating the selected colors. Then, during decoding, the decoder can receive and parse the syntax elements and, based on the syntax elements, select one or more colors from the previous palette data from the previous unit in the previous WPP row to include in the palette for the initial unit in the current WPP row (current palette). Alternatively, the encoder and decoder can use another approach to signal palette data.

The encoder and decoder can store all previous palette data from the previous unit in the previous WPP row. For example, the encoder and decoder can save, for each of C colors in the previous palette data from the previous unit in the previous WPP row, one or more color component values. Alternatively, to reduce memory consumption in some cases, the encoder and decoder can limit C by a threshold count for the previous palette data, such that palette data for the first C colors, limited by the threshold count, is stored for palette prediction.

D. Intra Copy Prediction—Introduction

In general, an intra copy mode uses intra copy prediction in which a current block, line, string or other section in a picture is predicted using previously reconstructed sample values in a reference block, line, string or other section in the same picture. For example, the intra copy mode can use intra block copy ("BC") prediction, intra line copy ("LC") prediction, or intra string copy ("SC") prediction.

In general, an intra BC mode uses intra BC prediction in which the sample values of a current block of a picture are predicted using sample values in the same picture. A block vector ("BV") value indicates a displacement from the current block to a block of the picture (the "reference block") that includes the sample values used for prediction. The reference block provides predicted values for the current block. The sample values used for prediction are previously reconstructed sample values, which are thus available at the encoder during encoding and at the decoder during decoding. The BV value is signaled in the bitstream, and a decoder can use the BV value to determine the reference block of the picture to use for prediction.

Figures 13, 14:
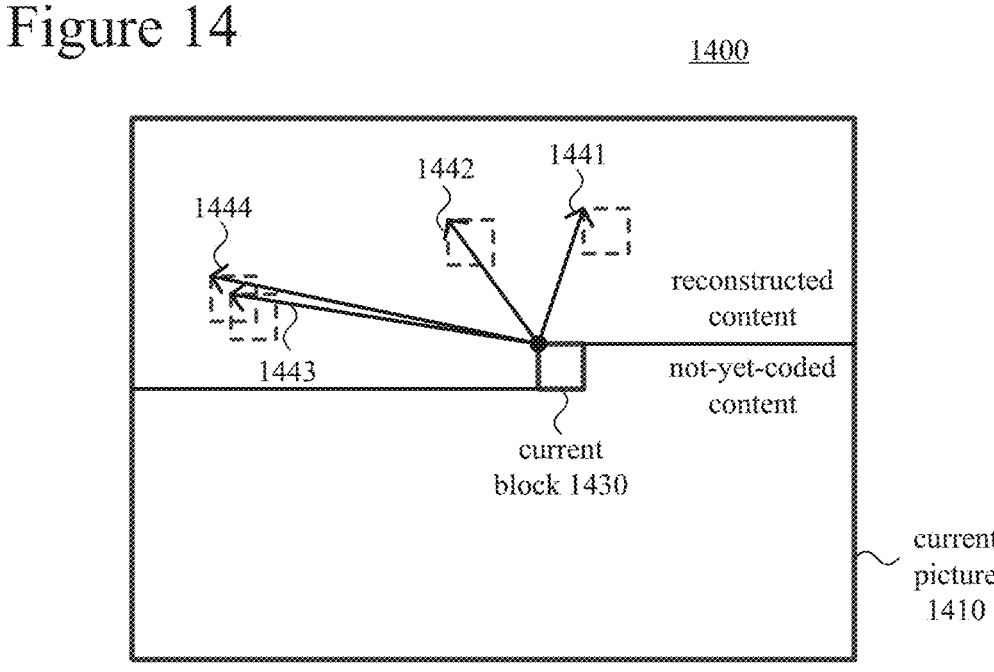
FIGS. 13 and 14 are diagrams illustrating aspects of an example of intra block copy prediction for a current block of a picture.

FIG. 13 shows an example (1300) of intra BC prediction for a current block (1330) of a current picture (1310). The current block can be a coding block ("CB") of a coding unit ("CU"), prediction block ("PB") of a prediction unit ("PU"), transform block ("TB") of a transform unit ("TU") or other block. The size of the current block can be 64×64, 32×32, 16×16, 8×8 or some other size. Blocks can be symmetrically or asymmetrically partitioned into smaller blocks for purposes of intra BC prediction. More generally, the size of the current block is m×n, where each of m and n is a whole number, and where m and n can be equal to each other or can have different values. Thus, the current block can be square or rectangular. Alternatively, the current block can have some other shape.

The BV (1340) indicates a displacement (or offset) from the current block (1330) to a reference block (1350) of the picture that includes the sample values used for prediction. The reference block (1350) can be identical to the current block (1330), or it can be an approximation of the current block (1330). Suppose the top-left position of a current block is at position $(x_0, y_0)$ in the current picture, and suppose the top-left position of the reference block is at position $(x_1, y_1)$ in the current picture. The BV indicates the displacement $(x_1-x_0, y_1-y_0)$. For example, if the top-left position of the current block is at position (256, 128), and the top-left position of the reference block is at position (126, 104), the BV value is (−130, −24). In this example, a negative horizontal displacement indicates a position to the left of the current block, and a negative vertical displacement indicates a position above the current block.

Intra BC prediction can improve coding efficiency by exploiting redundancy (such as repeated patterns inside a picture) using BC operations. Finding a matching reference block for a current block can be computationally complex and time consuming, however, considering the number of candidate reference blocks that the encoder may evaluate.

FIG. 14 shows an example (1400) illustrating some of the candidate reference blocks for a current block (1430) of a current picture (1410) when WPP is not enabled. Four BVs (1441, 1442, 1443, 1444) indicate displacements for four candidate reference blocks. When WPP is not enabled, the candidate reference blocks can be anywhere within the reconstructed content of the current picture (1410). (Blocks are generally coded from left-to-right, then from top-to-bottom.) A candidate reference block can overlap with other candidate reference blocks, as shown for the candidate reference blocks indicated by the BVs (1443, 1444). In some example implementations, a reference block is constrained to be within the same slice and tile as the current block. Such intra BC prediction does not use sample values in other slices or tiles. The location of a reference block may be subject to one or more other constraints, e.g., a constraint when WPP is enabled, as described below.

A block with prediction mode of intra BC prediction can be a CB, PB or other block. When the block is a CB, the BV for the block can be signaled at CU level (and other CBs in the CU use the same BV or a scaled version thereof). Or, when the block is a PB, the BV for the block can be signaled at PU level (and other PBs in the PU use the same BV or a scaled version thereof). More generally, the BV for an intra-BC prediction block is signaled at an appropriate syntax level for the block.

In general, an intra LC mode uses intra LC prediction in which the sample values of a current line of a current block of a picture are predicted using sample values in the same picture. An offset value indicates a displacement from the current line to a line of the picture (the "reference line") that includes the sample values used for prediction. The offset value is signaled in the bitstream, and a decoder can use the offset value to determine the reference line to use for prediction.

Figure 15:
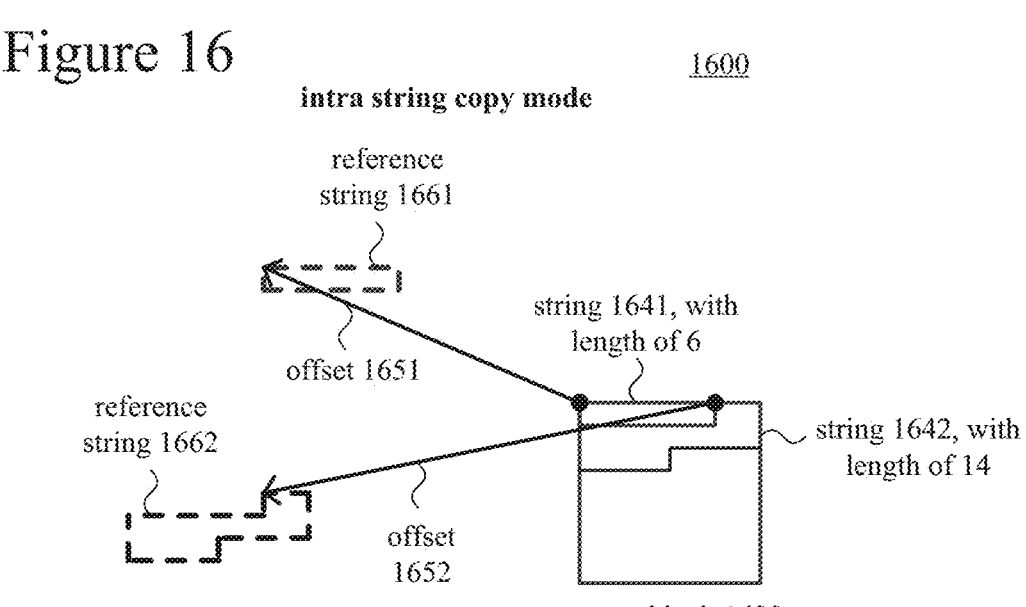

FIG. 15 illustrates an example (1500) of intra LC prediction for lines of a current block (1530) of a current picture. The current block can be a CB of a CU, PB of a PU, TB of a TU or other block. The size of the current block can be 64×64, 32×32, 16×16, 8×8 or some other size. More generally, the size of the current block is mx n, where each of m and n is a whole number, and where m and n can be equal to each other or can have different values. Thus, the current block can be square or rectangular. For intra LC prediction, a block is split into horizontal lines or vertical lines. Horizontal lines have a height of 1 sample and have the width of the current block. Vertical lines have a width of 1 sample and have the height of the current block.

In FIG. 15, a first offset (1551) indicates a displacement from a first line (1541) of the current block (1530) to a reference line (1561) that includes the sample values used for prediction of the first line (1541). A reference line can be identical to a given line, or it can be an approximation of the given line. A second offset (1552) indicates a displacement from a second line (1542) of the current block (1530) to a reference line (1562) that includes the sample values used for prediction of the second line (1542). An offset value (1551, 1552) is similar to a BV value, in that it indicates a displacement within the current picture. Although FIG. 15 shows horizontal lines, the current block (1530) can instead be split into vertical lines for intra LC prediction. A syntax element per block, per unit or per picture can indicate whether horizontal or vertical lines are used for intra LC prediction.

Intra LC prediction can improve coding efficiency by exploiting redundancy (such as repeated patterns inside a picture) using LC operations. When WPP is not enabled, the candidate reference lines can be anywhere within the reconstructed content of the current picture. A candidate reference line can overlap with other candidate reference lines. In some example implementations, a reference line is constrained to be within the same slice and tile as the current line. The location of a reference line may be subject to one or more other constraints, e.g., a constraint when WPP is enabled, as described below.

In general, an intra SC mode uses intra SC prediction in which the sample values of a current string of a current block of a picture are predicted using sample values in the same picture. An offset value indicates a displacement from the current string to a string of the picture (the "reference string") that includes the sample values used for prediction. A string length value indicates the length of the string in terms of sample values. The offset value and string length value are signaled in the bitstream, and a decoder can use the offset value and string length value to determine the reference string to use for prediction.

FIG. 16 shows an example (1600) of intra SC prediction for strings of a current block (1630) of a current picture. The current block can be a CB of a CU, PB of a PU, TB of a TU or other block. The size of the current block can be 64×64, 32×32, 16×16, 8×8 or some other size. More generally, the size of the current block is mxn, where each of m and n is a whole number, and where m and n can be equal to each other or can have different values. Thus, the current block can be square or rectangular. For intra SC prediction, a block is split into one or more strings. In FIG. 16, the current block (1630) is split into three strings. The strings of a block can be scanned horizontally—from left to right in a given row, then the next row, and so on. Or, the strings of a block can be scanned vertically—from top to bottom in a given column, then the next column, and so on. The strings in FIG. 16 are horizontally scanned.

In FIG. 16, a first offset (1651) indicates a displacement from a first string (1641) of the current block (1630) to a reference string (1661) that includes the sample values used for prediction of the first string (1641). The length of each of the first string (1641) and corresponding reference string (1661) is 6 sample values. A reference string can be identical to a given string, or it can be an approximation of the given string. A second offset (1652) indicates a displacement from a second string (1642) of the current block (1630) to a reference string (1662) that includes the sample values used for prediction of the second string (1642). The length of each of the second string (1642) and corresponding reference string (1662) is 14 sample values. No offset is shown for the third string of the current block (1630), which has a length of 44 samples. Like a BV value, an offset value (1651, 1652) indicates a displacement within the current picture. Although FIG. 16 shows horizontal scanning, the current block (1630) can instead be split into strings that are scanned vertically for intra SC prediction. A syntax element per block, per unit or per picture can indicate whether horizontal or vertical scanning order is used for intra SC prediction.

Intra SC prediction can improve coding efficiency by exploiting redundancy (such as repeated patterns inside a picture) using SC operations. Intra SC prediction is more flexible than intra BC prediction or intra LC prediction (allowing partitioning into arbitrary strings, not just fixed partitions), but signals more information (string length values in addition to offset values). When WPP is not enabled, the candidate reference strings can be anywhere within the reconstructed content of the current picture. A candidate reference string can overlap with other candidate reference strings. In some example implementations, a reference string is constrained to be within the same slice and tile as the current string. The location of a reference string may be subject to one or more other constraints, e.g., a constraint when WPP is enabled, as described below.

Intra copy prediction operations for intra BC mode, intra LC mode or intra SC mode can be applied at the level of CB (when a BV value or other offset value is signaled per CB or part thereof) or PB (when a BV value or other offset is signaled per PB or part thereof). In this case, a reference region is constrained to not overlap the current region or block including the current region. Alternatively, intra copy prediction operations can be applied for smaller sections within a PB or CB, even when the BV value or other offset value is signaled for the PB or CB (or part thereof). For example, for a first section of a block, the reference region includes positions outside the block. For a second section of the block, however, the reference region used in intra copy prediction operations can include positions in the previously reconstructed first section of the same block. In this way, a BV value or offset value can reference positions in the same PB or CB. Allowing intra copy prediction operations to be applied for sections within a PB or CB facilitates use of BV values or other offsets with relatively small magnitudes.

When a reference region for a current region in a current unit can include a position within the same unit, an encoder can check the validity of the BV value or other offset value by considering the z-scan orders of the current region and the reference region (which are in the same slice and same tile). For example, the encoder checks that the z-scan order of the block containing the reference region's bottom-right position $(x_0 + \text{offset}_x + m - 1, y_0 + \text{offset}_y + n - 1)$ is smaller than the z-scan order of the block containing the current region's top-left position $(x_0, y_0)$, where offset indicates the offset value and the current region and reference region have dimensions mx n. If so, the block that contains the bottom-right position of the reference region has been previously reconstructed (and hence so has the rest of the reference region). The encoder can also check that the offset value satisfies at least one of the conditions $\text{offset}_x + m \leq 0$ and $\text{offset}_y + n \leq 0$, ensuring that the reference region does not overlap the current region.

In general, the z-scan order follows a sequentially specified ordering of units that partition a picture. FIG. 17 shows example z-scan order (1700) for a current region (1730) and units that might include the bottom-right position of a reference region. The current region (1730) can be a CB, PB or other block, a line, or a rectangle that includes a string. The z-scan orders are generally assigned to units sequentially from left-to-right in a row, repeating in successive rows from top-to-bottom. When a unit is split, z-scan orders are assigned within the split unit, recursively. For implementations of encoding/decoding for the H.265/HEVC standard, the z-scan order proceeds CTU-to-CTU along a CTU raster scan pattern (left-to-right in a CTU row, repeating in successive CTU rows from top-to-bottom). If a CTU is split, the z-scan order follows a raster scan pattern for CUs of a quadtree within the split CTU. And, if a CU is split (e.g., into multiple CUs, or into multiple PUs), the z-scan order follows a raster scan pattern for blocks within the split CU.

In some example implementations, a BV value or other offset value is signaled for a CU, PU or other unit, and is applied for all blocks of the unit. Depending on color space and color sampling rate, the BV value or other offset value can be used for all blocks without scaling, or it can be scaled for blocks in different color components. Alternatively, different BV values or other offset values can be signaled for the different blocks of a unit. In some example implementations, the same prediction mode (e.g., intra BC mode) applies for all blocks of a unit. Alternatively, different blocks can have different prediction modes.

E. Constraints for Intra Copy Prediction when WPP is Enabled

In general, intra BC prediction, intra LC prediction and intra SC prediction use previously reconstructed sample values in a picture to predict the sample values of a current block, line or string of the same picture. As a rule, the area of a picture that includes the previously reconstructed sample values when WPP is enabled is different than the area of the picture that includes the previously reconstructed sample values when WPP is not enabled. For intra copy prediction, some constraints on location of a reference region are enforced whether or not WPP is enabled. One or more other constraints on the location of the reference region apply when WPP is enabled. The constraints on the location of the reference region can take the form of limits on allowed BV values for intra BC prediction or limits on allowed offset values for intra LC prediction or intra SC prediction.

Figure 18:
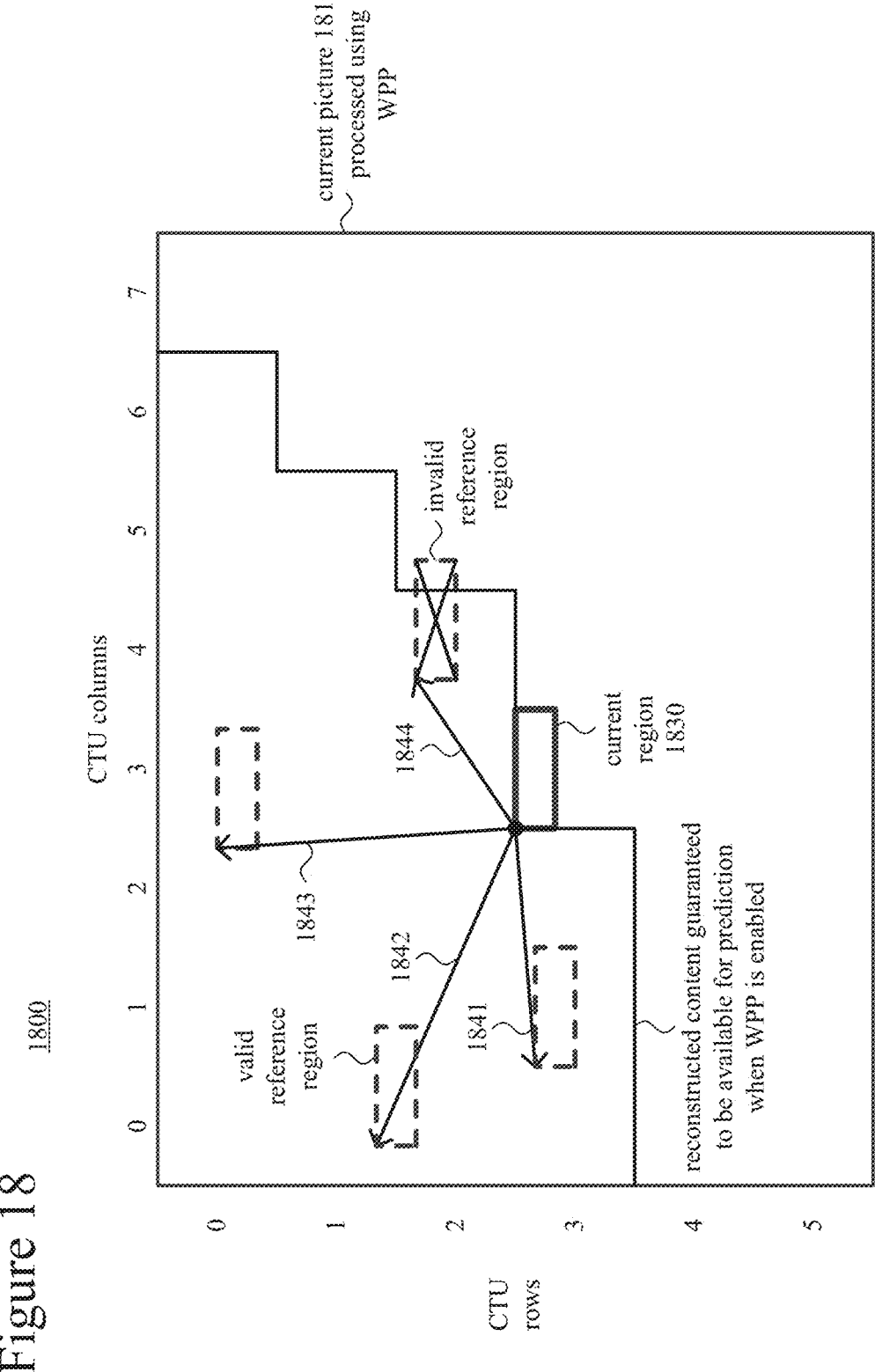
FIG. 18 is a diagram illustrating an example of constraints on location of a reference region for an intra copy mode when WPP is enabled, according to some described embodiments.

FIG. 18 shows an example (1800) of constraints on location of a reference region for a current region (1830) of a picture (1810) when WPP is enabled according to some example implementations. The picture (1810) is organized by CTU rows and CTU columns.

The current region (1830) is encoded or decoding with an intra copy mode. The current region (1830) is part of a current CTU. For the current CTU, dependencies cascade from previous CTU rows. When WPP is enabled, for processing of the current CTU to start, the CTU(s) to its left in the same row have been processed, and the CTUs in the previous row up to the above-right CTU have been processed. Similarly, for any one of these already processed CTUs, the CTUs to the left in the same row and CTUs in the previous row up to the above-right CTU have been processed. As shown in FIG. 18, these previously processed CTUs provide the reconstructed content guaranteed to be available for intra copy prediction when WPP is enabled.

FIG. 18 shows some of the candidate reference regions for the current region (1830) of the current picture (1810). Four offset values (1841, 1842, 1843, 1844) indicate displacements for four candidate reference regions. A candidate reference region can overlap with other candidate reference regions. The candidate reference regions can be anywhere within the reconstructed content of the current picture (1810). When WPP is not enabled, the reconstructed content of the current picture (1810) generally includes CTUs to the left of the current CTU and all CTUs in previous CTU rows. When WPP is enabled, however, less reconstructed content is available, as shown in FIG. 18. In FIG. 18, three of the offset values (1841, 1842, 1843) indicate valid reference regions. These valid reference regions include only sample values within the reconstructed content guaranteed to be available for intra copy prediction when WPP is enabled. One of the offset values (1844) indicates an invalid reference region, which includes at least some sample values outside the reconstructed content guaranteed to be available for intra copy prediction when WPP is enabled.

1. Encoding and Decoding with Constraints on Intra Copy Mode When WPP Is Enabled.

FIG. 19 shows a generalized technique (1900) for encoding with rules enforced for intra copy mode when WPP is enabled. An encoder such as the encoder shown in FIG. 3 or FIGS. 5a and 5b, or other encoder, can perform the technique (1900). FIG. 20 shows a generalized technique (2000) for decoding with rules enforced for intra copy mode when WPP is enabled. A decoder such as the decoder shown in FIG. 4 or FIG. 6, or other decoder, can perform the technique (2000).

With reference to FIG. 19, an encoder encodes (1910) a picture with WPP enabled. The encoding (1910) produces encoded data. As part of the encoding (1910), for an intra copy mode (e.g., a mode using intra BC prediction, intra LC prediction or intra SC prediction), the encoder enforces one or more constraints attributable to the WPP. The encoder outputs (1920) the encoded data as part of a bitstream.

With reference to FIG. 20, a decoder receives (2010) encoded data as part of a bitstream. The encoded data satisfies, for an intra copy mode (e.g., a mode using intra BC prediction, intra LC prediction or intra SC prediction), one or more constraints attributable to WPP. The decoder decodes (2020) the encoded data with the WPP enabled. The decoding (2020) reconstructs a picture.

A syntax element in the bitstream can indicate whether WPP is enabled for a video sequence, set of pictures or picture. The syntax element can be signaled in a SPS syntax structure, PPS syntax structure (e.g., the syntax element entropy_coding_sync_enabled_flag in H.265/HEVC implementations) or other syntax structure in the bitstream.

The intra copy mode can be intra BC mode. In this case, for a current block in the picture, an offset value indicates a displacement to a reference block in the picture. The reference block includes previously reconstructed sample values. Or, the intra copy mode can be intra LC mode. In this case, for a current line in a block of the picture, an offset value indicates a displacement to a reference line in the picture. The reference line includes previously reconstructed sample values that are scanned in a line scanning direction, which can be horizontal or vertical. Or, the intra copy mode can be intra SC mode. In this case, for a current string in a block of the picture, an offset value indicates a displacement to a reference string in the picture. The reference string includes previously reconstructed sample values that are scanned in a string scanning order, which can be horizontal or vertical. For the current string, a length value indicates length for each of the current string and the reference string. Or, the intra copy mode can be some other mode that uses an offset value to find a reference block, line, string or other section in a picture, for a current block, line, string or other section in the same picture, where the reference block, line, string, etc. includes previously reconstructed sample values.

The constraint(s) attributable to WPP can include a constraint that a horizontal displacement value from a reference region to a current region is less than or equal to a vertical displacement value from the current region to the reference region. For example, the horizontal displacement value measures a difference from a WPP column that includes a right edge of the reference region to a WPP column that includes a left edge of the current region, and the vertical displacement value measures a difference from a WPP row that includes a top edge of the current region to a WPP row that includes a bottom edge of the reference region. In some example implementations, each of the WPP columns is a column of CTUs, and each of the WPP rows is a row of CTUs. Alternatively, the constraint(s) attributable to WPP include one or more other and/or additional constraints.

If the intra copy mode is intra BC mode, the current region is a current block, and the reference region is a reference block. If the intra copy mode is intra LC mode, the current region is a current line, and the reference region is a reference line. If the intra copy mode is intra SC mode, the current region is a rectangle that includes a current string, and the reference region is a rectangle that includes a reference string. The encoder or decoder can identify the rectangle that includes the current string by determining a rectangle that includes a start position of the current string, an end position of the current string, and any positions between the start position and the end position of the current string in a string scanning order (e.g., horizontal, vertical). The encoder or decoder can identify the rectangle that includes the reference string using an offset value applied to the rectangle that includes the current string.

The encoder can also enforce one or more other constraints that are not attributable to WPP. For example, the encoder can check that a top-left position of the current region and a top-left position of the reference region are in the same slice, if applicable, and in the same tile, if applicable. As another example, the encoder can check that the top-left position of the current region and a bottom-right position of the reference region are in the same slice, if applicable, and in the same tile, if applicable. As still another example, the encoder can check that one of the following three conditions is satisfied: (a) a CTU row that includes a bottom edge of the reference region is above a CTU row that includes a top edge of the current region; (b) if the CTU row that includes the bottom edge of the reference region equals the CTU row that includes the top edge of the current region, then a CTU column that includes the right edge of the reference region is left of a CTU column that includes a left edge of the current region; and (c) if the CTU row that includes the bottom edge of the reference region equals the CTU row that includes the top edge of the current region, and if the CTU column that includes the right edge of the reference region equals the CTU column that includes the left edge of the current region, then the bottom-right position of the reference region is earlier in z-scan order than the top-left position of the current region.

The following sections detail examples of constraints that the encoder can enforce for intra BC prediction, intra LC prediction and intra SC prediction, respectively, when WPP is enabled, according to some example implementations.

2. Example Constraints on BV Values for Intra BC Prediction when WPP is Enabled.

This section details examples of constraints that the encoder can enforce for intra BC prediction when WPP is enabled. For a current block, the constraints verify that a candidate reference block indicated by a BV value includes reconstructed sample values that will be available when the current block is encoded or decoded, even when WPP is enabled.

Definitions. The current block starts from position $(x_0, y_0)$, relative to the top-left position of the current picture. The width and height of the current block are $w_{block}$ and $h_{block}$, respectively. The current block is part of a current CU. The CTU size is S. The current CU starts from $(x_{CU}, y_{CU})$ relative to the top-left position of the picture. The block vector is $(BV_x, BV_y)$.

The encoder verifies that all of the following constraints are satisfied.

First constraint. The encoder verifies that the position $(x_0, y_0)$ and the position $(x_0+BV_x, y_0+BV_y)$ are in the same slice and in the same tile. That is, the encoder verifies that the top-left position of the current block and the top-left position of the reference block are in the same slice and in the same tile. If the two positions are in different slices or different tiles, the first constraint is not satisfied.

Second constraint. The encoder verifies that the position $(x_0, y_0)$ and the position $(x_0+BV_x+w_{block}-1, y_0+BV_y+h_{block}-$ 1) are in the same slice and same tile. That is, the encoder verifies that the top-left position of the current block and the bottom-right position of the reference block are in the same slice and in the same tile. If the two positions are in different slices or different tiles, the second constraint is not satisfied.

For the first and second constraints, if multiple slices are not used, the two positions that are checked are necessarily in the same slice, and the first and second constraints for slices need not be checked. Similarly, if multiple tiles are not used, the two positions that are checked are necessarily in the same tile, and the first and second constraints for tiles need not be checked. All positions of the current block are in a single slice and single tile. If the first and second constraints are satisfied, all positions of the reference block are also in that slice and tile. The encoder checks the first and second constraints whether or not WPP is enabled.

Third constraint. For the third constraint, the encoder verifies that one of the following three conditions is satisfied. The encoder checks the third constraint whether or not WPP is enabled.

First condition of third constraint. The encoder checks whether $(y_0+BV_y+h_{block}-1)/S<y_0/S$. That is, the encoder calculates the CTU row that includes the bottom edge of the reference block: $(y_0+BV_y+h_{block}-1)/S$. The encoder also calculates the CTU row that includes the top edge of the current block: $y_0/S$. The encoder then checks whether the CTU row that includes the bottom edge of the reference block is above the CTU row that includes the top edge of the current block. If so, the reference block necessarily includes previously reconstructed sample values, at least when WPP is not enabled.

Second condition of third constraint. When $(y_0+BV_y+h_{block}-1)/S==y_0/S$, the encoder checks whether $(x_0+BV_x+w_{block}-1)/S<x_0/S$. That is, if the CTU row that includes the bottom edge of the reference block equals the CTU row that includes the top edge of the current block (same CTU row), the encoder calculates (a) the CTU column that includes the right edge of the reference block $((x_0+BV_x+w_{block}-1)/S)$, and (b) the CTU column that includes the left edge of the current block $(x_0/S)$. The encoder then checks whether the CTU column that includes the right edge of the reference block is left of a CTU column that includes the left edge of the current block. If so, the reference block necessarily includes previously reconstructed sample values.

Third condition of third constraint. When $(y_0+BV_y+h_{block}-1)/S==y_0/S$ and $(x_0+BV_x+w_{block}-1)/S==x_0/S$, the encoder checks whether the z-scan order of the position $(x_0+BV_x+w_{block}-1, y_0+yBV+h_{block}-1)$ is smaller than the z-scan order of the position $(x_0, y_0)$. That is, if the CTU row that includes the bottom edge of the reference block equals the CTU row that includes the top edge of the current block (same CTU row), and the CTU column that includes the right edge of the reference block equals the CTU column that includes the left edge of the current block (same CTU column), then the encoder checks whether the bottom-right position of the reference block is earlier in z-scan order than the top-left position of the current block. The third condition applies if prediction from within the current CU is allowed. If prediction from within the current CU is not allowed, $(x_0, y_0)$ should be $(x_{CU}, y_{CU})$.

Fourth constraint. The encoder checks the fourth constraint when WPP is enabled. For the fourth constraint, the encoder verifies that $(x_0+BV_x+w_{block}-1)/S-x_0/S<=y_0/S-(y_0+BV_y+h_{block}-1)/S$. That is, the encoder calculates the difference between the CTU column that includes the right edge of the reference block and the CTU column that includes the left edge of the current block: $(x_0+BV_x+w_{block}-$ $1)/S-x_0/S$. The encoder also calculates the difference between the CTU row that includes the top edge of the current block and the CTU row that includes the bottom edge of the reference block: $y_0/S-(y_0+BV_y+h_{block}-1)/S$. The encoder verifies that the first difference (between CTU columns) is less than or equal to the second difference (between CTU rows). As shown in the jagged line of CTUs from the current CTU upward and to the right in FIG. 8 or FIG. 18, this verifies that the reference block is part of reconstructed content guaranteed to be available for prediction when WPP is enabled.

3. Example Constraints on Offset Values for Intra LC Prediction when WPP is Enabled.

This section details examples of constraints that the encoder can enforce for intra LC prediction when WPP is enabled. For a current line, the constraints verify that a candidate reference line indicated by an offset value includes reconstructed sample values that will be available when the current line is encoded or decoded, even when WPP is enabled.

Definitions. The current block starts from position $(x_0, y_0)$, relative to the top-left position of the current picture. The width and height of the current block are $w_{block}$ and $h_{block}$, respectively. The current block is part of a current CU. The CTU size is S. The offset value for the current line is (offset$_x$, offset$_y$). L lines of the current block have already been processed.

The encoder defines start and end positions of the current line of the current block. The position $(x_{curr\_line\_start}, y_{curr\_line\_start})$ is the start position of the current line, and $(x_{curr\_line\_end}, y_{curr\_line\_end})$ is the end position of the current line. When horizontal scanning (also called row mode) is used, every line is a row of the current block: $(x_{curr\_line\_start}, y_{curr\_line\_start})=(x_0, y_0+L)$, and $(x_{curr\_line\_end}, y_{curr\_line\_end})= (x_0+w_{block}-1, y_0+L)$. When vertical scanning (also called column mode) is used, every line is a column of the current block: $(x_{curr\_line\_start}, y_{curr\_line\_start})=(x_0+L, y_0)$, and $(x_{curr\_line\_end}, y_{curr\_line\_end})=(x_0+L, y_0+h_{block}-1)$.

The encoder also defines start and end positions of a candidate reference line, which predicts the current line. The position $(x_{ref\_line\_start}, y_{ref\_line\_start})$ is the start position of the reference line. The position $(x_{ref\_line\_end}, y_{ref\_line\_end})$ is the end position of the reference line. A reference line can be a row (when horizontal scanning is used) or column (when vertical scanning is used). Whether horizontal scanning (row mode) or vertical scanning (column mode) is used: $(x_{ref\_line\_start}, y_{ref\_line\_start})=(x_{curr\_line\_start}, y_{curr\_line\_start})+ (offset_x, offset_y)$, and $(x_{ref\_line\_end}, y_{ref\_end})=(x_{curr\_line\_end}, y_{curr\_line\_end})+(offset_x, offset_y)$.

The encoder verifies that all of the following constraints are satisfied. For some of these constraints, the top-left position $(x_0, y_0)$ of the current block is considered. For such constraints, alternatively, the start position $(x_{curr\_line\_start}, y_{curr\_line\_start})$ of the current line can be checked instead of the top-left position $(x_0, y_0)$ of the current block.

First constraint. The encoder verifies that the position $(x_0, y_0)$ and the position $(x_{ref\_line\_start}, y_{ref\_line\_start})$ are in the same slice and in the same tile. That is, the encoder verifies that the top-left position of the current block and the start position of the reference line are in the same slice and in the same tile. If the two positions are in different slices or different tiles, the first constraint is not satisfied.

Second constraint. The encoder verifies that the position $(x_0, y_0)$ and the position $(x_{ref\_line\_end}, y_{ref\_line\_end})$ are in the same slice and same tile. That is, the encoder verifies that the top-left position of the current block and the end position of the reference line are in the same slice and in the same tile.

If the two positions are in different slices or different tiles, the second constraint is not satisfied.

For the first and second constraints, if multiple slices are not used, the two positions that are checked are necessarily in the same slice, and the first and second constraints for slices need not be checked. Similarly, if multiple tiles are not used, the two positions that are checked are necessarily in the same tile, and the first and second constraints for tiles need not be checked. All positions of the current line are in a single slice and single tile. If the first and second constraints are satisfied, all positions of the reference line are also in that slice and tile. The encoder checks the first and second constraints whether or not WPP is enabled.

Third constraint. For the third constraint, the encoder verifies that one of the following three conditions is satisfied. The encoder checks the third constraint whether or not WPP is enabled.

First condition of third constraint. The encoder checks whether $(P_{ref\_line\_end}/S < y_0/S$. That is, the encoder calculates the CTU row that includes the bottom edge or position of the reference line: $y_{ref\_line\_end}/S$. The encoder also calculates the CTU row that includes the top edge of the current block: $y_0/S$. The encoder then checks whether the CTU row that includes the bottom edge or position of the reference line is above the CTU row that includes the top edge of the current block. If so, the reference line necessarily includes previously reconstructed sample values, at least when WPP is not enabled.

Second condition of third constraint. When $y_{ref\_line\_end}/S == y_0/S$, the encoder checks whether $x_{ref\_line\_end}/S < x_0/S$. That is, if the CTU row that includes the bottom edge or position of the reference line equals the CTU row that includes the top edge of the current block (same CTU row), the encoder calculates (a) the CTU column that that includes the right edge or position of the reference line $(x_{ref\_line\_end}/S)$, and (b) the CTU column that includes the left edge of the current block $(x_0/S)$. The encoder then checks whether the CTU column that includes the right edge or position of the reference line is left of a CTU column that includes the left edge of the current block. If so, the reference line necessarily includes previously reconstructed sample values.

Third condition of third constraint. When $y_{ref\_line\_end}/S == y_0/S$ and $x_{ref\_line\_end}/S == x_0/S$, the encoder checks whether the z-scan order of the position $(x_{ref\_line\_end}$, Y'ref_line_end) is smaller than the z-scan order of the position $(x_{curr\_line\_start}, y_{curr\_line\_start})$. That is, if the CTU row that includes the bottom edge or position of the reference line equals the CTU row that includes the top edge of the current block (same CTU row), and the CTU column that includes the right edge or position of the reference line equals the CTU column that includes the left edge of the current block (same CTU column), then the encoder checks whether the end position of the reference line is earlier in z-scan order than the start position of the current line. The third condition applies if prediction from within the current CU is allowed. If prediction from within the current CU is not allowed, $(x_{curr\_line\_start}, y_{curr\_line\_start})$ should be $(x_0, y_0)$.

Fourth constraint. The encoder checks the fourth constraint when WPP is enabled. For the fourth constraint, the encoder verifies that $x_{ref\_line\_end}/S - x_0/S <= y_0/S - y_{ref\_line\_end}/S$. That is, the encoder calculates the difference between the CTU column that includes the right edge or position of the reference line and the CTU column that includes the left edge of the current block: $x_{ref\_line\_end}/S - x_0/S$. The encoder also calculates the difference between the CTU row that includes the top edge of the current block and the CTU row that includes the bottom edge or position of the reference line: $y_0/S - y_{ref\_line\_end}/S$. The encoder verifies that the first difference (between CTU columns) is less than or equal to the second difference (between CTU rows).

4. Example Constraints on Offset Values for Intra SC Prediction when WPP is Enabled.

This section details examples of constraints that the encoder can enforce for intra SC prediction when WPP is enabled. For a current string, the constraints verify that a candidate reference string indicated by an offset value and length value includes reconstructed sample values that will be available when the current string is encoded or decoded, even when WPP is enabled.

Definitions. The current block starts from position $(x_0, y_0)$, relative to the top-left position of the current picture. The width and height of the current block are $w_{block}$ and $h_{block}$, respectively. The current block is part of a current CU. The CTU size is S. The offset value for the current string is $(offset_x, offset_y)$, and the string length value for the current string is $length_{string}$. K pixels of the current block have already been processed using intra SC prediction.

The encoder defines start and end positions of the current string of the current block. The position $(x_{curr\_string\_start}, y_{curr\_string\_start})$ is the start position of the current string, and $(x_{curr\_string\_end}, y_{curr\_string\_end})$ is the end position of the current string. The encoder also defines a bounding rectangle that contains the start position of the current string, the end position of the current string, and any positions (in the string scanning order) between the start and end positions of the current string. The top-left position of the bounding rectangle is $(x_{curr\_rect\_TL}, y_{curr\_rect\_TL})$. The bottom-right position of the bounding rectangle is $(x_{curr\_rect\_BR}, y_{curr\_rect\_BR})$. The encoder defines a reference rectangle (including the reference string) as the bounding rectangle displaced by the offset value. The top-left position of the reference rectangle is $(x_{ref\_rect\_TL}, y_{ref\_rect\_TL})$. The bottom-right position of the bounding rectangle is $(x_{ref\_rect\_BR}, y_{ref\_rect\_BR})$.

When horizontal string scanning is used (left to right in a row of the current block, from top row to bottom row), the start position is: $(x_{curr\_string\_start}, y_{curr\_string\_start}) = (x_0 + K \% w_{block}, y_0 + K/w_{block})$. The end position is: $(x_{curr\_string\_end}, y_{curr\_string\_end}) = (x_0 + (K + length_{string} - 1) \% w_{block}, y_0 + (K + length_{string} - 1)/w_{block})$. When the start position and end position of the current string are in the same row of the current block, $(x_{curr\_rect\_TL}, y_{curr\_rect\_TL}) = (x_{curr\_string\_start}, y_{curr\_string\_start})$, and $(x_{curr\_rect\_BR}, y_{curr\_rect\_BR}) = (x_{curr\_string\_end}, y_{curr\_string\_end})$. Otherwise, the top-left position of the bounding rectangle is $(x_{curr\_rect\_TL}, y_{curr\_rect\_TL}) = (x_0, y_0 + K/w_{block})$, and the bottom-right position of the bounding rectangle is $(x_{curr\_rect\_BR}, y_{curr\_rect\_BR}) = (x_0 + w_{block} - 1), y_0 + (K + length_{string} - 1)/w_{block})$.

When vertical scanning is used (top to bottom in a column of the current block, from left column to right column), the start position is: $(x_{curr\_string\_start}, Y'curr\_string\_start) = (x_0 + K/h_{block}, y_0 + K \% h_{block})$. The end position is: $(x_{curr\_string\_end}, Y'curr\_string\_end) = (x_0 + (K + length_{string} - 1)/h_{block}, y_0 + (K + length_{string} - 1) \% h_{block})$. When the start position and end position of the current string are in the same column of the current block, $(x_{curr\_rect\_TL}, y_{curr\_rect\_TL}) = (x_{curr\_string\_start}, y_{curr\_string\_start})$, and $(x_{curr\_rect\_BR}, y_{curr\_rect\_BR}) = (x_{curr\_string\_end}, y_{curr\_string\_end})$. Otherwise, the top-left position of the bounding rectangle is $(x_{curr\_rect\_TL}, y_{curr\_rect\_TL}) = (x_0 + K/h_{block}, y_0)$, and the bottom-right position of the bounding rectangle is $(x_{curr\_rect\_BR}, y_{curr\_rect\_BR}) = (x_0 + (K + length\ string - 1)/h_{block}), y_0 + h_{block} - 1)$.

Whether horizontal scanning or vertical scanning is used, the top-left position of the reference rectangle is $(x_{ref\_rect\_TL}, y_{ref\_rect\_TL}) = (x_{curr\_rect\_TL}, y_{curr\_rect\_TL}) + (offset_x, offset_y)$, and the bottom-right position of the reference rectangle is $(x_{ref\_rect\_BR},\ y_{ref\_rect\_BR})=(x_{curr\_rect\_BR},\ y_{curr\_rect\_BR})+$ (offset$_x$, offset$_y$). Finally, the start position of the reference string is $(x_{ref\_string\_start},\ y_{ref\_string\_start})=(x_{curr\_string\_start},\ y_{curr\_string\_start})+$(offset$_x$, offset$_y$).

The encoder verifies that all of the following constraints are satisfied. For some of these constraints, the top-left position $(x_0, y_0)$ of the current block is considered. For such constraints, alternatively, the start position of the current string or top-left position of the bounding rectangle can be checked instead of the top-left position $(x_0, y_0)$ of the current block.

First constraint. The encoder verifies that the position $(x_0, y_0)$ and the position $(x_{ref\_rect\_TL}, y_{ref\_rect\_TL})$ are in the same slice and in the same tile. That is, the encoder verifies that the top-left position of the current block and the top-left position of the reference rectangle are in the same slice and in the same tile. If the two positions are in different slices or different tiles, the first constraint is not satisfied.

Second constraint. The encoder verifies that the position $(x_0, y_0)$ and the position $(x_{ref\_rect\_BR}, y_{ref\_rect\_BR})$ are in the same slice and same tile. That is, the encoder verifies that the top-left position of the current block and the bottom-right position of the reference rectangle are in the same slice and in the same tile. If the two positions are in different slices or different tiles, the second constraint is not satisfied.

For the first and second constraints, if multiple slices are not used, the two positions that are checked are necessarily in the same slice, and the first and second constraints for slices need not be checked. Similarly, if multiple tiles are not used, the two positions that are checked are necessarily in the same tile, and the first and second constraints for tiles need not be checked. All positions of the current string are in a single slice and single tile. If the first and second constraints are satisfied, all positions of the reference rectangle (and hence the reference string) are also in that slice and tile. The encoder checks the first and second constraints whether or not WPP is enabled.

Third constraint. For the third constraint, the encoder verifies that one or more of the following conditions are satisfied. The encoder checks the third constraint whether or not WPP is enabled.

First condition of third constraint. The encoder checks whether $y_{ref\_rect\_BR}/S<y_0/S$. That is, the encoder calculates the CTU row that includes the bottom edge of the reference rectangle: $y_{ref\_rect\_BR}/S$. The encoder also calculates the CTU row that includes the top edge of the current block: $y_0/S$. The encoder then checks whether the CTU row that includes the bottom edge of the reference rectangle is above the CTU row that includes the top edge of the current block. If so, the reference rectangle necessarily includes previously reconstructed sample values, at least when WPP is not enabled.

Second condition of third constraint. When $y_{ref\_rect\_BR}/S==y_0/S$, the encoder checks whether $x_{ref\_rect\_BR}/S<x_0/S$. That is, if the CTU row that includes the bottom edge of the reference rectangle equals the CTU row that includes the top edge of the current block (same CTU row), the encoder calculates (a) the CTU column that includes the right edge of the reference rectangle $(x_{ref\_rect\_BR}/S)$, and (b) the CTU column that includes the left edge of the current block $(x_0/S)$. The encoder then checks whether the CTU column that includes the right edge of the reference rectangle is left of the CTU column that includes the left edge of the current block. If so, the reference rectangle necessarily includes previously reconstructed sample values.

Third condition of third constraint. When $y_{ref\_rect\_BR}/S==y_0/S$ and $x_{ref\_rect\_BR}/S==x_0/S$, the encoder checks whether the z-scan order of the position $(x_{ref\_rect\_BR}, y_{ref\_rect\_BR})$ is smaller than the z-scan order of the position $(x_0, y_0)$. That is, if the CTU row that includes the bottom edge of the reference rectangle equals the CTU row that includes the top edge of the current block (same CTU row), and the CTU column that includes the right edge of the reference rectangle equals the CTU column that includes the left edge of the current block (same CTU column), then the encoder checks whether the bottom-right position of the reference rectangle is earlier in z-scan order than the top-left position of the current block.

Fourth condition of third constraint. If prediction from within the current CU is allowed, when $y_{ref\_string\_start}==y_0$, the encoder checks that $x_{ref\_string\_start}<x_0$. That is, if prediction from within the current CU is allowed, the third constraint can be satisfied if the current string and reference string start in the same row, and the reference string starts to the left of the current string.

Fourth constraint. The encoder checks the fourth constraint when WPP is enabled. For the fourth constraint, the encoder verifies that $x_{ref\_rect\_BR}/S-x_0/S<=y_0/S-y_{ref\_rect\_BR}/S$. That is, the encoder calculates the difference between the CTU column that includes the right edge or position of the reference rectangle and the CTU column that includes the left edge of the current block: $x_{ref\_rect\_BR}/S-x_0/S$. The encoder also calculates the difference between the CTU row that includes the top edge of the current block and the CTU row that includes the bottom edge or position of the reference rectangle: $y_0/S-y_{ref\_rect\_BR}/S$. The encoder verifies that the first difference (between CTU columns) is less than or equal to the second difference (between CTU rows).

Fifth constraint. For the fifth constraint, the encoder verifies that $K+length_{string}<=w_{block}*h_{block}$. That is, the encoder checks that the current block includes enough positions for the current string, considering the count of positions that have already been processed.

F. Alternatives and Variations

In many of the examples described herein, intra copy prediction and motion compensation are implemented in separate components or processes, and offset estimation and motion estimation are implemented in separate components or processes. Alternatively, intra copy prediction can be implemented as a special case of motion compensation, and offset estimation can be implemented as a special case of motion estimation, for which the current picture is used as a reference picture. In such implementations, an offset value can be signaled as an MV value but used for intra copy prediction (within the current picture) rather than inter-picture prediction. As the term is used herein, "intra copy prediction" indicates prediction within a current picture, whether that prediction is provided using an intra-picture prediction module, a motion compensation module, or some other module. Similarly, a BV value or other offset value can be represented using an MV value or using a distinct type of parameter or syntax element, and offset estimation can be provided using an intra-picture estimation module, motion estimation module or some other module.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. In a computing system, a method comprising:

receiving, as part of data in a bitstream, a flag that indicates whether or not wavefront parallel processing ("WPP") is enabled, the flag being part of a picture parameter set syntax structure or sequence parameter set syntax structure in the bitstream;

determining, based on the flag, that WPP is enabled; and reconstructing a picture, including, for a palette decoding mode, predicting a palette for an initial unit in a current WPP row of the picture using previous palette data from a previous unit in a previous WPP row of the picture, wherein the previous WPP row is immediately above the current WPP row, the previous unit in the previous WPP row being above the initial unit in the current WPP row, wherein the previous palette data from the previous unit in the previous WPP row includes, for each of C colors, one or more color component values, and wherein C is limited by a threshold count for the previous palette data from the previous unit in the previous WPP row.

2. The method of claim 1, wherein the palette for the initial unit in the current WPP row represents at least some colors used in the initial unit in the current WPP row.

3. The method of claim 1, wherein the previous palette data from the previous unit in the previous WPP row (a) represents at least some colors used in a palette for the previous unit in the previous WPP row or (b) was inherited by the previous unit in the previous WPP row.

4. The method of claim 1, wherein the reconstructing the picture further includes predicting a palette for a subsequent unit in the current WPP row of the picture using palette data from the palette for the initial unit in the current WPP row of the picture.

5. The method of claim 1, wherein the current WPP row and the previous WPP row are rows of coding tree units, and wherein the initial unit in the current WPP row and the previous unit in the previous WPP row are coding units.

6. The method of claim 1, wherein the predicting includes one or more of:

determining whether to reuse the previous palette data from the previous unit in the previous WPP row as the palette for the initial unit in the current WPP row; and selecting one or more colors from the previous palette data from the previous unit in the previous WPP row to include in the palette for the initial unit in the current WPP row.

7. The method of claim 1, wherein the predicting the palette for the initial unit in the current WPP row does not use previous palette data from a last unit in the previous WPP row.

8. The method of claim 1, wherein the previous unit in the previous WPP row is immediately above the initial unit in the current WPP row or immediately above and to the right of the initial unit in the current WPP row.

9. A computer system comprising a processor and memory, the computer system implementing a video encoder configured to perform operations comprising:

determining that wavefront parallel processing ("WPP") is enabled;

outputting, as part of data in a bitstream, a flag that indicates whether or not WPP is enabled, the flag being part of a picture parameter set syntax structure or sequence parameter set syntax structure in the bit-stream; and encoding a picture, including, for a palette coding mode, predicting a palette for an initial unit in a current WPP row of the picture using previous palette data from a previous unit in a previous WPP row of the picture, wherein the previous WPP row is immediately above the current WPP row, the previous unit in the previous WPP row being above the initial unit in the current WPP row, wherein the previous palette data from the previous unit in the previous WPP row includes, for each of C colors, one or more color component values, and wherein C is limited by a threshold count for the previous palette data from the previous unit in the previous WPP row.

10. The computer system of claim 9, wherein the palette for the initial unit in the current WPP row represents at least some colors used in the initial unit in the current WPP row.

11. The computer system of claim 9, wherein the previous palette data from the previous unit in the previous WPP row (a) represents at least some colors used in a palette for the previous unit in the previous WPP row or (b) was inherited by the previous unit in the previous WPP row.

12. The computer system of claim 9, wherein the encoding the picture further includes predicting a palette for a subsequent unit in the current WPP row of the picture using palette data from the palette for the initial unit in the current WPP row of the picture.

13. The computer system of claim 9, wherein the current WPP row and the previous WPP row are rows of coding tree units, and wherein the initial unit in the current WPP row and the previous unit in the previous WPP row are coding units.

14. The computer system of claim 9, wherein the predicting includes one or more of:

determining whether to reuse the previous palette data from the previous unit in the previous WPP row as the palette for the initial unit in the current WPP row; and selecting one or more colors from the previous palette data from the previous unit in the previous WPP row to include in the palette for the initial unit in the current WPP row.

15. The computer system of claim 9, wherein the predicting the palette for the initial unit in the current WPP row does not depend on previous palette data from a last unit in the previous WPP row.

16. The computer system of claim 9, wherein the previous unit in the previous WPP row is immediately above the initial unit in the current WPP row or immediately above and to the right of the initial unit in the current WPP row.

17. One or more non-transitory computer-readable media having stored thereon data as part of a bitstream, wherein the data includes a flag that indicates whether or not wavefront parallel processing ("WPP") is enabled, the flag being part of a picture parameter set syntax structure or sequence parameter set syntax structure, wherein the data further includes encoded data for one or more slices of a picture, and wherein the data is usable to cause a video decoder, when processing the data in a computer system having one or more processing units and memory, to perform operations comprising:

determining, based on the flag, that WPP is enabled; and reconstructing the picture based at least in part on the encoded data for the one or more slices of the picture, including, for a palette decoding mode, predicting a palette for an initial unit in a current WPP row of the picture using previous palette data from a previous unit in a previous WPP row of the picture, wherein the previous WPP row is immediately above the current WPP row, the previous unit in the previous WPP row being above the initial unit in the current WPP row, wherein the previous palette data from the previous unit in the previous WPP row includes, for each of C colors, one or more color component values, and wherein C is limited by a threshold count for the previous palette data from the previous unit in the previous WPP row.

18. The one or more computer-readable media of claim 17, wherein the current WPP row and the previous WPP row are rows of coding tree units, and wherein the initial unit in the current WPP row and the previous unit in the previous WPP row are coding units.

19. The one or more computer-readable media of claim 17, wherein the previous palette data from the previous unit in the previous WPP row (a) represents at least some colors used in a palette for the previous unit in the previous WPP row or (b) was inherited by the previous unit in the previous WPP row.

20. The one or more computer-readable media of claim 17, wherein the previous unit in the previous WPP row is immediately above the initial unit in the current WPP row or immediately above and to the right of the initial unit in the current WPP row.

* * * * *